United States Patent [19]

Bongiorno et al.

[11] Patent Number: 4,843,399

[45] Date of Patent: Jun. 27, 1989

[54] PORTABLE NAVIGATIONAL COMMUNICATIONS TRANSCEIVER

[75] Inventors: Robert A. Bongiorno, Glenside; John F. Smith, Warminster, both of Pa.

[73] Assignee: Narco Avionics, Inc., Fort Washington, Pa.

[21] Appl. No.: 892,065

[22] Filed: Jul. 30, 1986

[51] Int. Cl.⁴ .............................................. G01S 1/44
[52] U.S. Cl. .................................... 342/404; 364/451; 342/49
[58] Field of Search ................... 342/401, 404, 49, 50, 342/51, 413, 419, 455, 394, 396, 442, 451, 127; 324/83 D; 364/451, 452, 461; 328/133, 134

[56] References Cited

U.S. PATENT DOCUMENTS

| | | | |
|---|---|---|---|
| 3,130,401 | 4/1964 | Murphy | 342/46 |
| 3,332,080 | 7/1967 | Verwey | 342/399 |
| 3,495,248 | 2/1970 | Raether et al. | 342/401 |
| 3,525,979 | 8/1970 | Kunkel et al. | 340/23 X |
| 3,540,051 | 11/1970 | Forsythe, Jr. | 235/150.27 |
| 3,550,127 | 12/1970 | Hrusovskey | 342/401 |
| 3,581,073 | 5/1971 | Visher | 235/150.26 |
| 3,659,291 | 5/1972 | Anthony | 364/451 |
| 3,750,942 | 8/1973 | Bean | 235/105.27 X |
| 3,755,817 | 8/1973 | Wipff et al. | 235/105.27 X |
| 3,787,860 | 1/1974 | Greatline et al. | 342/401 |
| 3,796,867 | 3/1974 | Abnett et al. | 235/150.27 |
| 3,803,611 | 4/1974 | Becker, Jr. | 340/27 NA X |
| 3,821,523 | 6/1974 | Chisholm et al. | 235/150.27 |
| 3,872,389 | 3/1975 | Willard | 328/137 |
| 3,918,662 | 11/1975 | Vircks et al. | 342/413 X |
| 3,919,706 | 11/1975 | Grimm et al. | 328/134 |
| 3,940,763 | 2/1976 | Paradise | 342/49 |
| 3,979,057 | 9/1976 | Katz et al. | 235/156 |
| 4,061,297 | 12/1977 | Foster | 364/451 X |
| 4,068,308 | 1/1978 | Opper | 364/449 |
| 4,086,632 | 4/1978 | Lions | 364/444 |
| 4,097,922 | 6/1978 | Vito et al. | 364/443 |
| 4,156,912 | 5/1979 | Shigeta et al. | 364/443 |
| 4,170,756 | 10/1979 | Shepperd | 455/82 |
| 4,212,067 | 7/1980 | Henderson | 364/460 |
| 4,247,898 | 1/1981 | Bosselaers | 364/460 |
| 4,253,149 | 2/1981 | Cunningham et al. | 364/444 |
| 4,340,936 | 7/1982 | Mounce | 364/443 |
| 4,413,322 | 11/1983 | Foster et al. | 364/448 |
| 4,422,076 | 12/1983 | Tricoles et al. | 367/12 X |
| 4,475,106 | 10/1984 | Andrews | 342/435 |
| 4,488,108 | 12/1984 | Treise et al. | 328/133 X |
| 4,497,034 | 1/1985 | Kuno et al. | 364/571 |
| 4,551,854 | 11/1985 | Rutty et al. | 455/78 |
| 4,577,194 | 3/1986 | Ragsdale | 364/448 X |
| 4,604,625 | 8/1986 | Davidson | 342/401 |
| 4,651,282 | 3/1987 | Robinson et al. | 364/449 X |

FOREIGN PATENT DOCUMENTS

| | | | |
|---|---|---|---|
| 2756233 | 6/1979 | Fed. Rep. of Germany | 342/401 |
| 1114976 | 9/1984 | U.S.S.R. | 324/83 D |
| 1177763 | 9/1985 | U.S.S.R. | 324/83 D |

OTHER PUBLICATIONS

"Geostar"; Jim Schefter; Popular Science; Feb. 1984, pp. 76–79.
Narco Avionics, Inc.; Model HT 800, Handheld Transceiver Manual; 7/1985, pp. 1–17.
Narro RNAV Systems NS 800 Spec Sheet, 12-1984, pp. 1–2.
King Radio, Inc. NAV/Comm. Receiver Spec Sheet, date unknown, pp. 1–4.
STS Inc., Handheld Transceiver Manual, 4-1986, pp. 1–7.

Primary Examiner—Thomas H. Tarcza
Assistant Examiner—Tod Swann
Attorney, Agent, or Firm—John J. Simkanich

[57] ABSTRACT

A hand held navigational-communications transceiver is compressed into a case having a volume of about 37 cubic inches by defining functional implementation for VOR (VHF omni-directional range) navigation. The transceiver can be selectively switched to process and display directional radial information. A microprocessor circuit provides primary circuitry information in combination with transceiver function software held in ROM (read only memory). A plurality of pre-programmed frequencies may be selected.

16 Claims, 19 Drawing Sheets

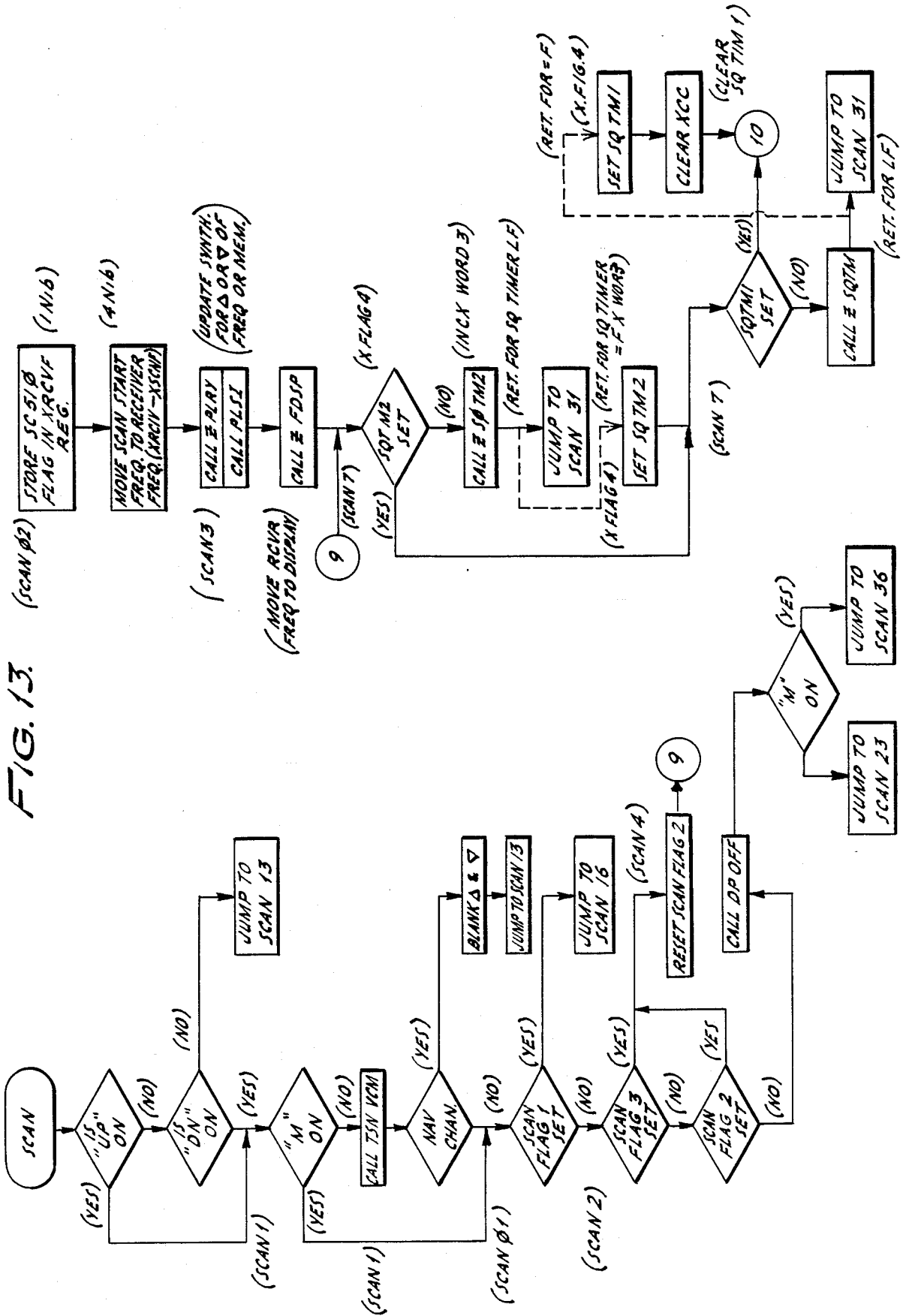

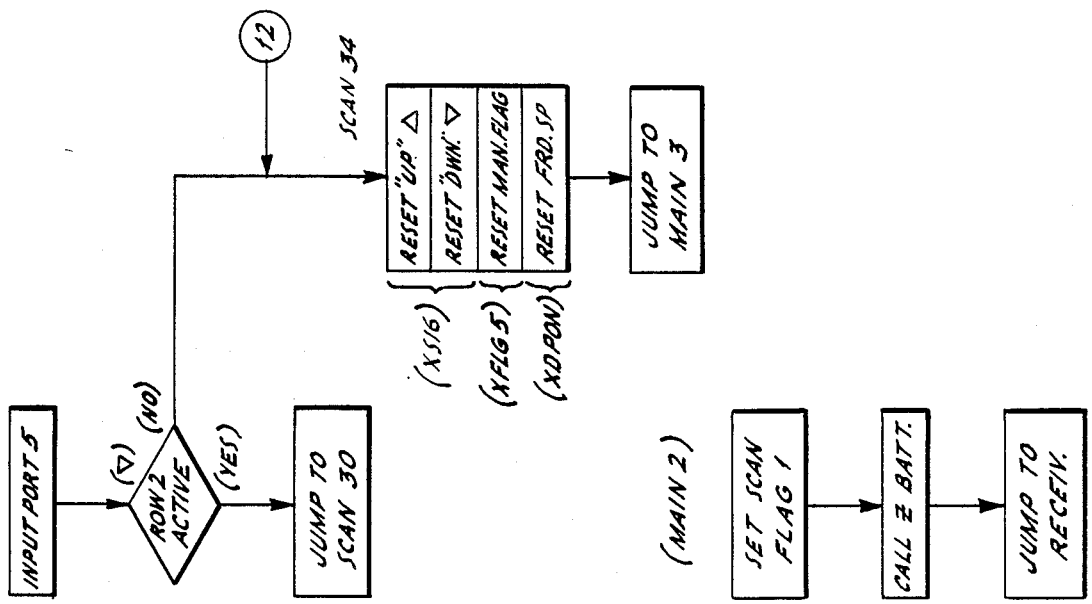
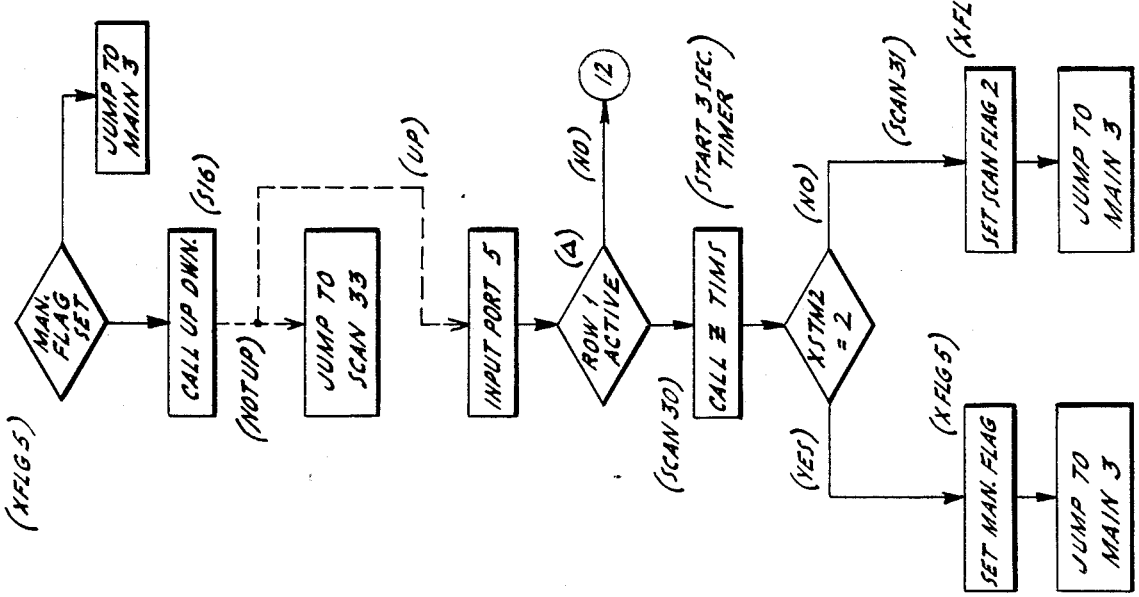
FIG. 17.

PORTABLE NAVIGATIONAL COMMUNICATIONS TRANSCEIVER

BACKGROUND OF THE INVENTION

This invention relates to aviation radios especially those used in general aviation for VOR navigation. The invention specifically relates to NAV/COM transceivers (navigational/ communications) using digital circuitry which circuitry has been configured for low power consumption and for compact size it being incorporated into a hand held unit.

Navigational systems incorporate time and phase shift information in computing distance, bearing and position.

A radio compass is an airborne instrument which operates similarly to a ground direction finder. A sense antenna is an omni-directional type, the signal from which antenna is mixed in the receiver with signal received from the antenna's loop. The radio compass operates on the difference in phas of the induced voltages in a loop and sense antenna outputs provides a cardiod pattern to enable resolution of ambiguity. A cardiod is formed by the additional of the onmi-directional signal to the part of the loop signal with which it is in phase; and the subtraction of the omni-directional signal from the part of the loop signal which it is 180° out of phase. The resulting cardioid antenna pattern has only a single minimum. Only one null position exists for this antenna system. Consequently both direction and sense can be determined from this arrangement.

Omnirange is an azimuth measurement utilizing phase measurement. The signal transmitted by a ground station is formed in such manner that aircraft at different bearings from the station receive distinct information. In affect, the system furnishes the pilot directional guidance by producing definite, descrete courses or paths in space. Radio signals whose characteristics differ as they sweep through 360° are most commonly used for taking bearings in an aircraft system. The aircraft receiver measures the phase difference between two modulation signals on a given carrier. The first signal corresponds to a rotating beam of a becon while the second signal provides the north reference.

A rotating pattern whose phase depends upon its direction at any instant its called the variable phase pattern. A second pattern provides signal reference. The signal is arranged so that at 0° (North) the two signals are in phase, while at other positions of the beam of rotation the variable signal lags behind that of the reference as it covers the 360° of azimuth. At 90° the two signals are 90° out of phase, at a 180° they are 180° out of phase, and so on. The radio equipment in the aircraft measures this phase difference between the reference and the variable signal and thereby determines a positive azimuth reading called "bearing".

V-H-F omnidirectional range (VOR), which is the most commonly employed system, contains a carrier signal which is modulated with a reference signal, which is in turn frequency modulated at a rate of 30 Hz. The time at which the 30 Hz space modulation signal reaches its amplitude peak is depended upon the direction from the station. This signal, when demodulated in an aircraft receiver, results in a 30 Hz voltage, the phase of which is a function of the bearing from the station.

The system is also adjusted so that the positive maximum signal of the amplitude modulated (variable-phase) pattern points to magnetic North at exactly the same instant the frequency modulated (reference-phase) signal reaches its maximum. The circuits within the aircraft receiver compare the phase of the amplitude (space) modulated 30 Hz signal and the voltage recovered from the FM signal modulation. The comparison results in a phase difference directly proportional into 2° of azimuth from the North reference.

A localizer is a vertical plane formed by the radiation of signals from the ground and permits the aircraft to align with the runway centerline during initial approach and descent. This localizer signal includes a number of side bands which enable the aircraft to determine how far it is off the centerline. A modulation method is used which is intended to stablize the alignment of the one course signal with the centerline of the runway. Therefore one side of the centerline has a modulated carrier reference signal and the othe side has a side band signal. With these two signals, the aircraft can determine whether it is off to the left or off to the right of the centerline of the runway. The approach to the runway therefore is defined by the radiation pattern which has a sharp deviation in the side bands creating a null directly along the runway centerline. The radio pattern laid down by a localizing antenna includes a symmetrical pattern about the X-Y axis having a null when approached either from the North or south and a slight dimple when approached either from east or west, wherein the frequency transmitted in each of the quadrants changes, i.e., the first quadrant having a 150 Hz signal and second quadrant having 90 Hz signal and third quadrant having a 150 Hz signal and the fourth quadrant having 90 Hz signal, wherein the North, South, East, West direction are not geographic North, South, East, West, but aligned with the ordinate and axis of a horizontal plot about the centerline of the runway. A very popular type of glide slop is a constant-intesity glide slope. Glide slopes or angles of approach may be generated by antennas putting out parabolic signals, each parabolic envelope having a centerline which may define an angle of approach. A typical glide slope angle is 2.5° which is an angle generally satisfactory for all present day fixed wing aircraft.

One type of glide path indicator is the NULL reference system, wherein the first null of the 150 Hz pattern created by a reference lobe appears at the desired slop angle of 2.5°. In the aircraft's receiver, the 150 Hz output predominates below the glide slope and the 90 Hz output predominates above the glide slope. A distriminator therefore is capable of putting out a signal which can be displayed to the pilot designating whether he is below or above the desired glide path.

The localizer glide slope equipment therefore needs two antennas. One at a slightly different altitude than the second. Energy leaving the first antenna contains equal modulation at 90 and 150 Hz frequencies to serve as a reference signal. Energy leaving the second antenna contains only the side band energy and may be adjusted with respect to the amount of modulated carrier energy.

A navigationsl radial is any one of a number of line of position defined by an azimuth navigational facility. The radial is identified by its bearing (usually the magnetic bearing) "from" the facility. One need merely calculate the supplemental angle (i.e., 360-R where R is the radial bearing from the facility) to find the radial "to" the facility.

General aviation transceivers have in the past utilized specific circuits for specific navigational functions and other specific circuits for sub-functions.

Visher, U.S. Pat. No. 3,581,073 shows an electroinc course line computer. Smith, U.S. Pat. No. 4,184,158 shows a VOR/LOC navigational radio having multiplexed operation. Smith, U.S. Pat. No. 4,215,346 shows a LOC and GS navigational radio. It is understood of course, that "LOC" means localizer signals and "GS" means glide slope signals.

Certain measurements and calculations used in these types of navigational radios are also implemented with specific circuitry. Ferrara, U.S. Pat. No. 4,011,503 shows a phase relation measuring circuit for two signals. Smith, U.S. Pat No. 4,184,157 shows an identification tone reconstitution circuit.

Improved sub-circuits for thes navigational radios have also been developed. McClaskey, U.S. Pat. No. 3,932,821 shows an out of lock detector for a phase lock loop synthesizer.

McClaskey et al U.S. Pat. No. 3,949,296 shows a synthesizer circuit and in U.S. Pat. No. 3,949,305 shows a second synthesizer circuit while in U.S. Pat. No. 3,949,304 shows a fractional megahertz counter for a synthesizer circuit.

Smith, U.S. Pat. No. 4,044,309 shows an automatic squelch circuit for a navigational radio while, Ferrara et al U.S. Pat. No. 4,025,923 shows a synchronous filter circuit for a VOR radio.

All of the above-identified prior art circuits and radios are implemented from descrete components and packaged into the instrument panel of a small airplane.

What is needed is a small, hand held NAV/COM transceiver radio with its own battery pack which can be used as an auxiliary radio or an emergency radio or as the primary radio for light air ballons and experimental/homemade aircraft.

An object of the present invention is to provide a navigational communications VOR transceiver radio of reduced size, being a hand held portable.

A second object is to provide such a radio where certain functions are microprocessor implememted.

A further object is to provide such a radio where signal filtering is custom software implemented.

A further object is to provide such a circuit with redistribution of navigational radio functions between circuitry and between custom software loaded memory accessable to microprocessor components permitting for reduction of circuit size.

An even further object is to implement a navigational seperater decoder circuit utilizing microprocessing circuitry operating under custom software.

SUMMARY OF THE INVENTION

The objects of the present invention are realized in a portable navigational digital/circuit implemented transceiver for providing 720 radio communications channels (COM), and 200 navigational channels (NAV), a localizer indicator (LOC), and three-digit bearing information.

COM channals and NAV channals are preselectable and their identity, up to 10 channals is stored in memory. The circuit is automatically turned to a digitally selected channel upon operator selection.

A 16 key keyboard provides input data to the circuit which is microprocessor driven, and which contains a program memory in which navigational circuit functions are addressed, and implemented in program software.

A plurality of function switches add additional control to select mode of operation, program channel frequencies, and lock out the keyboard.

A liquid crystal display is used as the information display to the display. An error signal "E" is displayed for improper frequency program entry by the operator when compared to the stored 720 COM, and 200 NAV channel frequencies.

A microphone and speaker provide two-way radio audio communications. A push to talk (PTT) circuit is incorporated.

The circuit receives localizer signals when in the localizer mode (LOC) with a "LOC" indicator displayed.

Bearing information is calculated and displayed. This bearing information is displayed in degrees from the ground station.

The microprocessor circuit computes bearing information using a pulse counter to generate a "electronic window", i.e. control the receipt of data as a function of time position. The size of this "window" is developed as the size of the phase difference between AM and FM signals. A NAV decoder is implemented in program software.

The redistribution of circuit signal processing functions between metal oxide semiconductor (MOS) circuitry being implemented hardware, descrete components, and program software being microprocessor implemented, permits a significant reduction in the total package size for the transceiver over what had previously been available.

A rechargeable battery pack with battery voltage level sensor is incorporated into the circuitry. A low battery voltage signal "BATT" is displayed when the rechargeable battery pack voltage drops. A liquid (LCD) is used to minimize power usage.

DESCRIPTION OF THE DRAWINGS

The advantages, features, and operation of this invention will be better understood from a reading of the following detailed description of the invention in connection with accompanying drawings in which like numerals refer to like elements and in which:

FIGS. 6–19 are flow chart logic for the program instructions held in the program memory.

DETAILED DESCRIPTION OF THE INVENTION

A transceiver unit being a microprocessor controlled hand held 720 channnal communication transceiver covering the band of 118.00 to 135.975 MHz and a 200 channal NAV receiver covering the band of 108.00 to 117.95 MHz is provided. An antenna is included which antenna is removable and the unit may be connected to the aircraft's COM antenna.

NAV and COM frequencies are displayed on a liquid crystal display (LCD) and are entered by a 16-key keyboard. In the RAD mode of operation the VOR Radial is displayed. The user is alerted when an illegal setting is made by the appearance of the letter "E" (error) in the display. Ten pre-programmable NAV or COM frequencies may be stored in a non-volatile memory and manually selected for use or automatically scanned by one of three selected automatic scanning modes. A memory lockout feature is provided in which programmable frequencies can be locked out of the manual or automatic scan.

The unit is powered by a rechargeable, quickly changed, NiCad. battery pack. An optional non-rechargeable alkaline battery pack for emergency use is connectable. The operation of the unit is altered when the battery pack voltage has dropped below its usable limit. This is indicated by the display of the letters "BATT" in the LCD display. The liquid crystal display can be illuminated to facilitate viewing in darkness.

Figure 1:
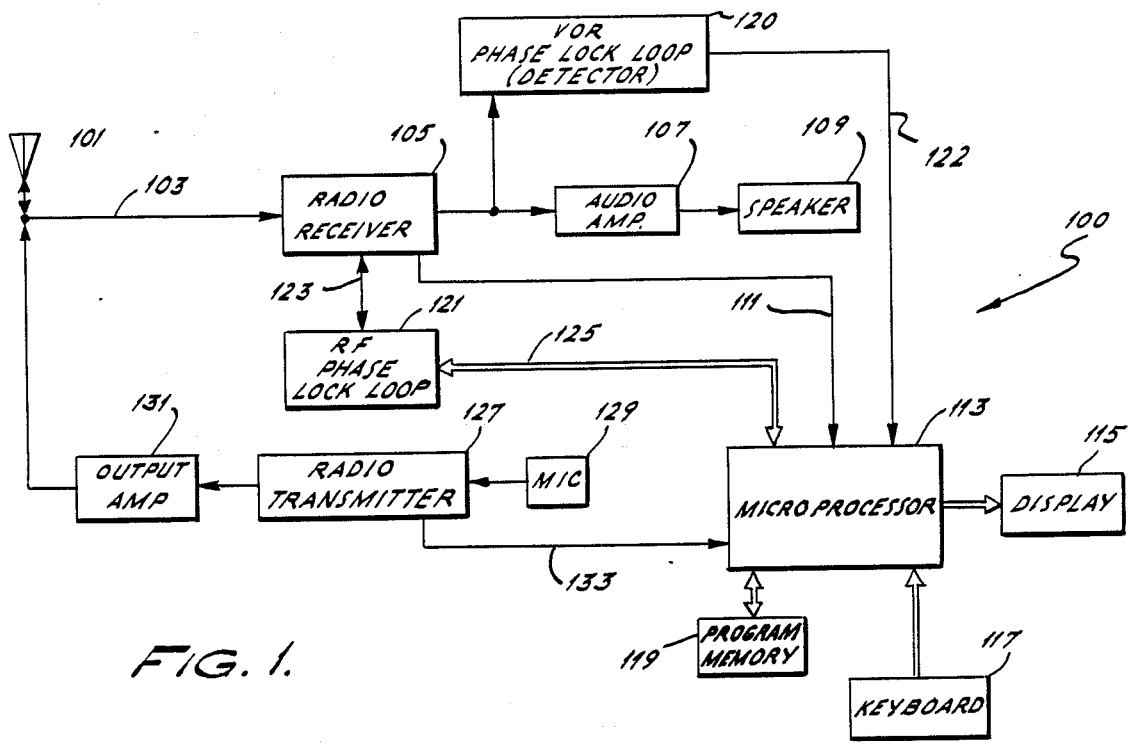
FIG. 1 is a general block diagram of the main components of the portable navigational communication transceiver invention.

FIG. 1, shows a general block diagram of the main circuit portions of the invention 100. An antenna 101 is connected to the unit 100 to receive signals and to transfer these signals through a connection 103 to a radio receiver circuit 105. The radio receiver circuit 105 is connected to send its output to an audio amplifier circuit 107 which in turn drives an assortment of speaker systems 109.

The radio receiver circuit 105, through a connection 111, sends signals to a microprocessor circuit 113. This microprocessor 113 drives a liquid crystal display 115. A keyboard 117 is connected to enter certain limited instructions into the microprocessor 113. Microprocessor 113 also includes an program memory 119 which contains navigational processing software in non-volatile memory.

An RF phase lock loop circuit 121 is included. This phase lock loop circuit 121 is connected through a connection 123 to the radio receiver circuit 105, and through another connection 125 to the microprocessor 113.

A radio transmitter circuit 127 receives audio from an operator microphone 129. The output of the radio transmitter circuit 127 is connected to an output amplifier 131 which feeds signals to the antenna 101. The radio transmitter circuit 127 is also connected to the microprocessor 113 through a connection 133.

A VOR phase lock loop circuit 120 (detector) is connected to the output of the radio receiver 105 and has its output connected to the mircoprocessor 113 through line 122.

Figure 1B:
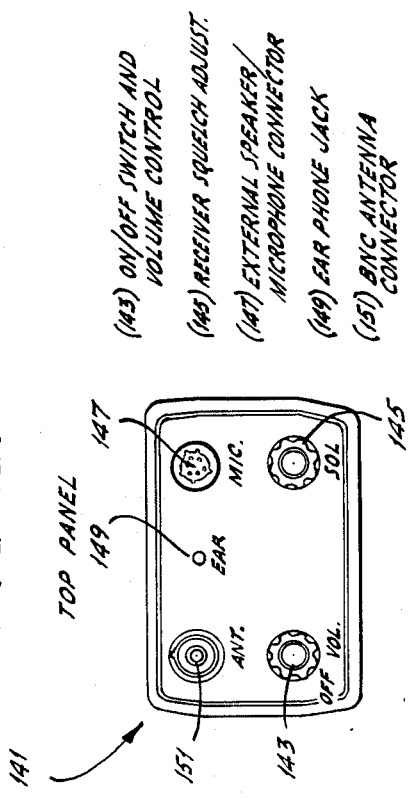
FIG. 1B shows the top panel of the case.
Figure 1C:
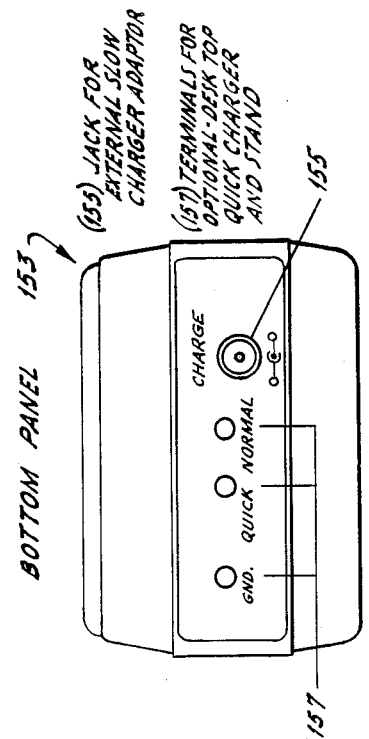
FIG. 1C shows the bottom panel of the case.
Figure 1A:
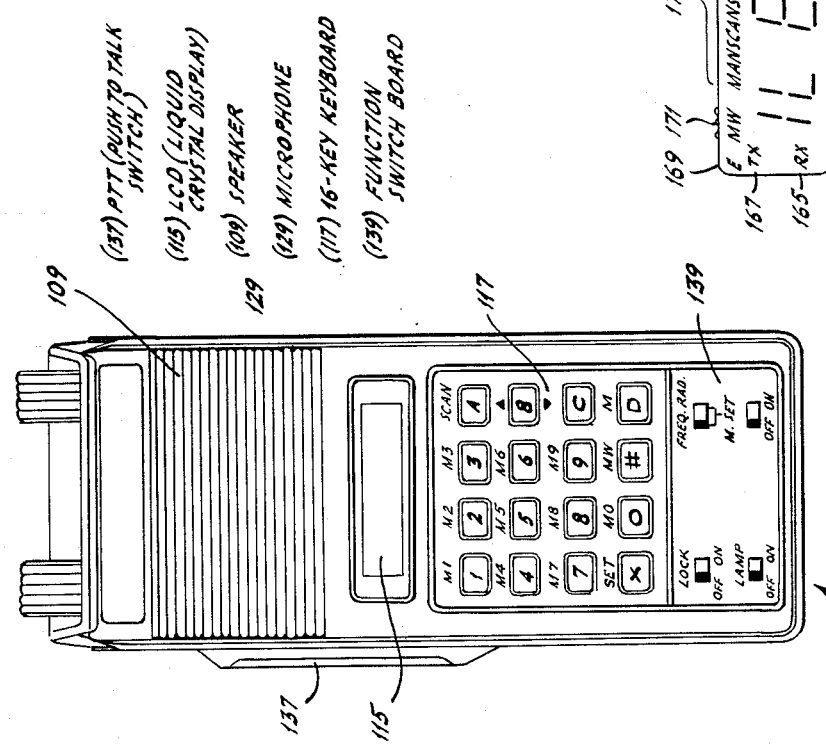
FIG. 1A shows the case in which the transceiver invention is housed, including the operator interface components.

The circuitry shown in FIG. 1, as well as, the additional components which complete the portable unit of the invention are housed in a case 135, FIG. 1A. This case 135 includes a push-to-talk switch (PTT) 137, a liquid crystal display 115, a 16 key keyboard 117, a microphone 129, and four individiual function switches 139 in a panel on the front face of this case. The speaker 109 is also included.

Case 135 has a top panel 141 which includes an on/off switch 143. Also, on this top panel 141 is a receiver squelch adjustment knob 145, an external speaker-microphone connector 147, an earphone jack 149, and a BNC antenna connector 151 for connecting to the antenna 101 of FIG. 1.

The bottom panel 153 of the case 135 is shown in FIG. 1C. This bottom includes a jack for external slow charge adapter 155, and terminal 157 for optional desk top quick charger and stand.

The 16 key keyboard 117 includes entry keys for the operator. The numbered keys are used to assign a frequency. The letters M0-M9 define 10 memory locations in the memory of the microprocessor 113 where assigned frequencies may be stored. These keys are also used to recall or access these stored frequencies.

The function keys on the keyboard 117 as follows:

SET KEY: This key is used to set the assigned COM or NAV frequency. After a frequency is selected and displayed, the SET KEY must be depressed. When this key is depressed, a decimal will appear after the third digit in the display 115. SCAN MODE SELECTOR KEY: This key selects any one of the 4 modes (MAN, SCAN, SRCH, OPEN) in sequence as the key is repeatedly depressed. Each mode appears in the display 115.

SCAN UP AND MEMORY LOCKOUT KEY ("B"):

1. In the Band Mode, when this key is depressed, scanning starts toward a frequency higher than the frequency displayed.

2. In Memory Mode, scanning starts toward the next higher numbers memory channels (M0-M9) in sequence until all 10 memory channels have been scanned.

3. Memory Lockout: Any memory location, M1 to M9, may be locked out of the scanning sequence when the M-SET slide switch is ON and this key is depressed. Location (M) cannot be locked out.

SCAN DOWN KEY ("C"):

1. When operating in the Band Mode and this key is depressed, scanning starts down from the frequency displayed.

2. In the Memory Mode, when this key is depressed, scanning starts toward the next lower numbered memory location that appears in the display 115.

MEMORY MODE KEY ("D"): When this key is depressed, the radio switches from the Band Mode to the Memory Mode of operation. Simultaneously a letter "M" (memory) appears in the upper left corner of the display.

MEMORY WRITE KEY ("MW"): The function of this key is to place the radio in a "write to memory" location mode. This key is disabled when the M-SET slide switch on panel 139 is turned OFF. When the M-SET slide switch on panel 139 is turned ON and the Memory Write Key depressed, the letters "MW" will appear in the upper left corner of the display 115.

As stated above four select switches 139 comprise a panel on the face of the case 135. These select switches operate as follows:

LOCK SWITCH: If the LOCK-ON position is set, all 16 keys are dispabled and no keyboard 117 operation is possible.

LAMP SWITCH: If the LAMP-ON is set, the LCD display 115 is illuminated by an internal lamp to facilitate viewing in low ambient light.

FREQ-RAD SWITCH:

1. When this switch is placed in the FREQ position and the M-SET switch in the OFF position, NAV or COM frequency setting (LCD displays the set frequency) and COM Band Mode scanning (automatic or manual) are possible.

2. When the FREQ and M-SET "On" positions are set, selected frequencies may be stored by using the MW (memory write) Key and keys M0 to M9 as the locations in memory.

3. When the RAD position is selected and the active frequency is a VOR channel, the LCD indicates the VOR Radial. If the active frequency is a LOC channel, the LCD indicates the letter "LOC". All keys are inoperative when a Radial or LOC legend is displayed and Band scanning is not possible.

M-SET SWITCH:

1. When the M-SET "On" position is selected and the FREQ RAD switch is set to FREQ, the Memory Write Key ("MW") is enabled permitting the programming of memory locations M0 to M9.

2. When the M-SET and FREQ slide switches are both ON and the radio is in the Memory Mode of operation, the Memory Lock Out Key is ("B") is enabled.

Figure 1D:
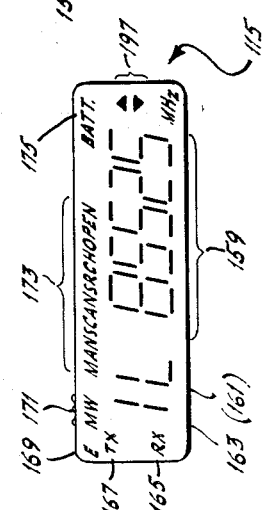
FIG. 1D shows a detail of the liquid crystal display on the case.

The liquid crystal display 115 is shown in detail in FIG. 1D.

This display 115 is capable of providing the following information which is identified with respect to the numeral appearing on the figure:

(154) Numerical frequency in MHz is displayed in both the Band and Memory Modes. Shown displayed is 135.525 Mhz.

(161) The letter "L" is displayed when the unit is in the Memory Mode of operation and one of the memory locations M1 to M9 has been "locked out" by the switch on the panel 139. The display shows memory location M1 has been locked out of the scanning sequence.

(163) Memory Location digit is displayed when the unit is placed in the Memory Mode of operation, and a memory location key (M0 to M9) is depressed, that location digit will appear here. Shown displayed is memory location M1.

(165) The letter RX will appear here when the receiver locks on to a valid NAV or COM received signal. The received frequency will also be displayed.

(167) The letters TX will appear here when the PTT switch 137 is depressed provided the displayed frequency is a COM frequency.

(169) The letter E (error) appears here whenever an illegal setting is made into the display. In addition, all of the numerical display will blank.

(171) Two modes can be displayed here. The letter M (Memory Mode) will be displayed whenever the "D" Key is depressed. The letters MW (Memory Write) will be displayed whenever the M-Set slide switch on panel 139 is ON and the "MW" Key on the keyboard 117 is depressed.

(173) This area displays the particular one of the possible Scanning Modes. Four distinct sets of letters will appear here indicating the selected scan mode. When the "A" Key depressed repeatedly, the following letters will sequentialy appear: MAN (manual), SCAN, SRCH (search), OPEN.

(175) Battery Alert signal is also displayable. The letters BATT will appear here when the battery pack voltage has fallen below the lower limit of useable charge.

(177) UP/DOWN Scanning indicators are also provided. When the "B" Key is on keyboard 117 is depressed, the "up arrow" will appear (UP scan). When the "C" Key on keyboard 117 is depressed, the "down arrow" appears (DOWN scan).

When the FREQ RAd switch on panel 139 is set to the RAD position and the active frequency is a VOR/LOC channel, the VOR radial or a "LOC" legend will be displayed in the previously discussed display areas for "L" 161 and channel frequency 159. Vor Radial Example: "F196"; LOC Legend Example: "LOC".

The display 115, FIG. 1D, provides an 8 digit alphanumeric display of which the frequency of any com channel or NAV channel selected is display by 6 digits (159).

Figure 2:
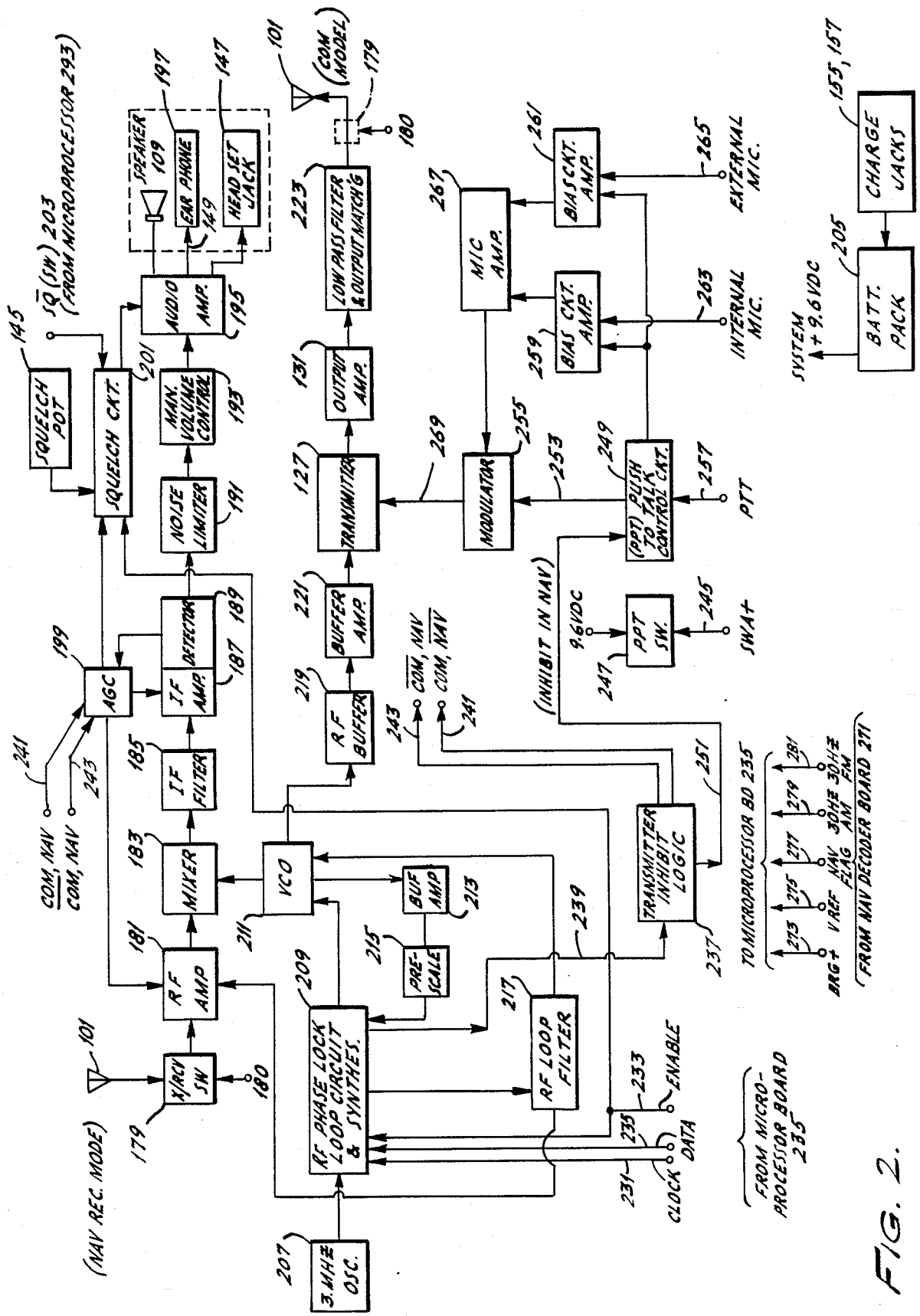
FIG. 2 is a circuit block diagram of the COM and NAV circuit board component.

The circuitry for the communications and navigational signal processing is housed partially on a COM/NAV board, FIG. 2. Here the antenna 101 feeds a transmitter-receiver switch 179 which is controlled by a signal 180 from the microprocessor which will be discussed below. The signal from this switch 179 is feed to RF amplipher 181. The RF amplifier sends the signal onto a mixer 183, and then I.F. Filter 185.

The output from this I.F. Filter 185 is connected into an IF amplifier circuit 187 which has associated on its output a detector circuit 189. The detector 189 output is connected into a noise limiter circuit 191. The noise limiter circuit 191 has its output connected to a manual volume controller circuit 193. This controller 193 is connected to feed the signal onto an audio amplifier 195. The audio amplifier 195 has audio outputs to a speaker 109, an earphone 197 whose connection is made through the previously discussed jack 149, and a head set jack previously discussed as the external speaker-microphone connector 147.

An output from the detector 189 is connected back into an automatic gain control circuit 199 (A.G.C.). An output from this A.G.C. 199 is connected into the IF amplifier, and into the RF amplifier 181.

A squelch circuit 201 receives a signal from the A.G.C. 199, and provides an input signal to the audio amplifier 195. This squelch circuit 201 is controlled through a squelch switch signal 203 from the microprocessor 293 discussed below, and receives an input from a squelch adjustment pot (potentiometer) 145.

The above described circuit components of FIG. 2 are implemented in circuitry of standard design, the details of which are known to those in this technology including some discussed above.

The circuit FIG. 2, includes a NiCad battery pack 205 of standard design. This battery pack 205 provides +9.6 VDC to the system. This voltage is used in must of the components or divided down to a lower level as know by those in this technology. This battery pack 205 is charged via quick charge jacks or external slow charge jacks 155.

A 3.2 MHz oscillator 207 provides the basic timing pulses to the circuitry. This oscillator 207 is connected into an RF phase lock loop and synthesizer circuit 209. As an example, this circuit 209 can be implemented using a Motorola Corporation Model MC 145156 synthesizer circuit which is a CMOS LSI (c-metal oxide semi-conductor, large scale intergration) circuit. An output from this circuit 209 is connected into a voltage controlled oscillator (VCO) 211. A first output from this VCO 211 is connected into the mixer 103. A second output from this VCO 211 is connected through a buffer amplifier 213 into a prescaler circuit 215 and back into the synthesizer circuit 209. The R.F. phase lock loop/synthesizer circuit 209 also has an output directly to the VCO 211.

The synthesizer circuit 209 has an additional output into a R.F. loop filter 217. An output from this loop filter 217 is connected back into VCO 211, while a second output from this loop filter 217 is connected back into the RF amplifier 181.

The output from the VCO 211 is also connected into an RF buffer circuit 219 which passes this signal onto a buffer amplifier circuit 221. The output from this buffer amplifier circuit is passed onto a transmitter circuit 127 and then onto an output amplifier 131. The output from the output amplifier 131 passes through a low pass filter and output matching circuit 223. This low pass filter and output matching circuit 223 is connected to feed its signal onto the transmit and receive switch 179 and out to the antenna 101.

Again the additional cicuitry described herein above with respect to FIG. 2 is implemented with circuit components known circuitry. The following additional circuitry described below has not been implemented in the past.

The synthesizer circuit 209 as implemented with MC 145156, has a clock input signal 231, a data input signal 235, and a enable input 233. Clock signals 231 are feed from a microprocessor board 235 described below. Likewise, the enable signal 233 is connected into this synthesizer 209 from this microprocessor board 235. This microprocessor board also supplies data including NAV and COM status over the line 235 into the synthesizer circuit 209. The enable line 233 is also connected into the squelch circuit 201 to selectively control its operation from the microprocessor board 235.

A transmitter inhibit logic circuit 237 acts as an isolation controller and receives an input on the line 239 from the synthesizer circuit 209. The transmitter inhibit circuit 209 circuit 237 is of resonable common design as OP AMP switch logic. A first outputs line from this inhibit logic circuit 237 is a first status line being a COM and not NAV signal line 241 and a second status line being a not COM and a NAV signal line 243. The signal lines 241, and 243 are connected into the A.G.C. circuit 199. A switch A+ input 245 is connected to a push to tuck switch 247 which receives power from the battery pack 205. This push to talk switch 247 acts a relay to enable operation of a push to talk control logic circuit 249 which provides a plurality of output lines signaling various components that the unit is in the transmission mode. An input line 251 carries an inhibit status signal from NAV mode from the inhibit logic 237 to the PTT control logic 249. An output line 253 from the push to talk logic circuit 249 is connected to a modulator circuit 255. The push to talk logic circuit receives a PTT signal 257 from the microprocessor board 235.

A pair of bias circuit amplifiers 259 and 261 are used to receive an internal microphone input 263 and external microphone input 265, with the input 263 connected to the bias circuit amplifier 259 and the input 265 connected to the bias circuit amplifier 261. Each bias circuit amplifier 259 and 261 is connected to feed its output signal into a microphone amplifier circuit 267. The output from this microphone amplifier circuit 267 is con-nected into the modulator 255. The modulator 255 has an output line 269 connected to the transmitter 127.

Also connected to this circuit are a plurality of additional signals commonly used in the NAV and COM circuits. These signals are provided from a NAV decoder board 271 which will be described below and are passed onto the microprocessor board 235. The signals include a bearing A+ signal 273, a voltage reference signal 275, a NAV flag signal 277, a 30 Hz AM signal 279, and 30 Hz FM signal 281.

Figure 3:
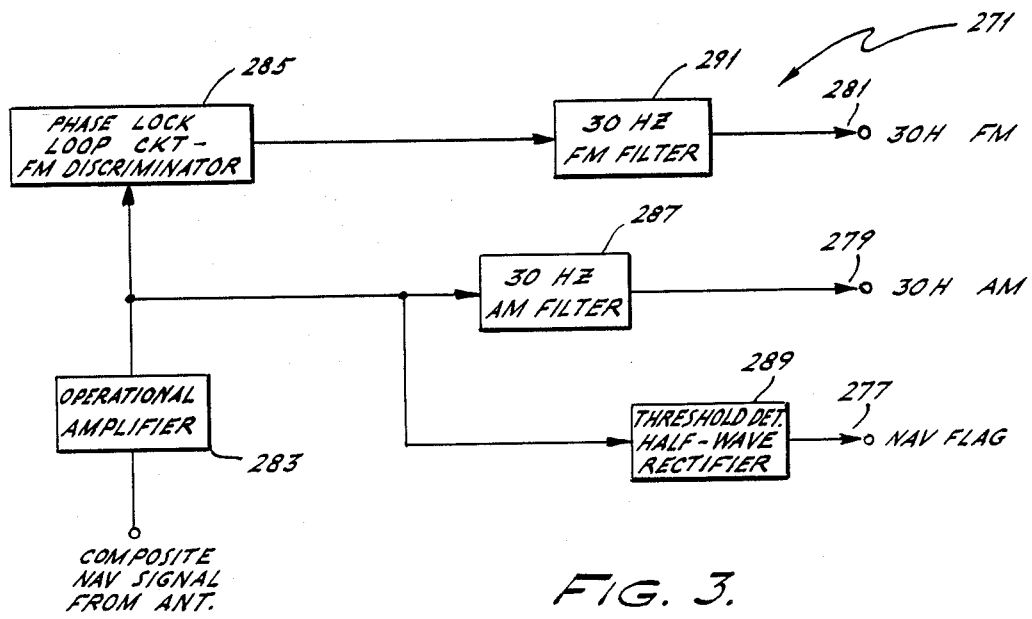
FIG. 3 is a circuit block diagram of the NAV decoder circuit board component.

The navigational decoder board 271 is shown above in FIG. 3. Here the composite NAV signal from the antenna 101 is connected into an operational amplifier circuit 283. The output from this operational output circuit is fed first into a phase lock loop circuit 285 operated as a FM discriminator circuit, and likewise fed into a 30 Hz AM filter circuit 287 and a threshold detector circuit 289 implemented as a half wave rectifier. The output from the FM discriminator circuit 285 is connected into a 30 Hz FM filter circuit 291.

The 30 Hz FM filter circuit 291 provides the 30 Hz FM reference signal 281, while the 30 Hz AM filter 287 provides the 30 Hz AM reference signal 279 and the threshold detector 289 provides the NAV flag signal 277.

Figure 4:
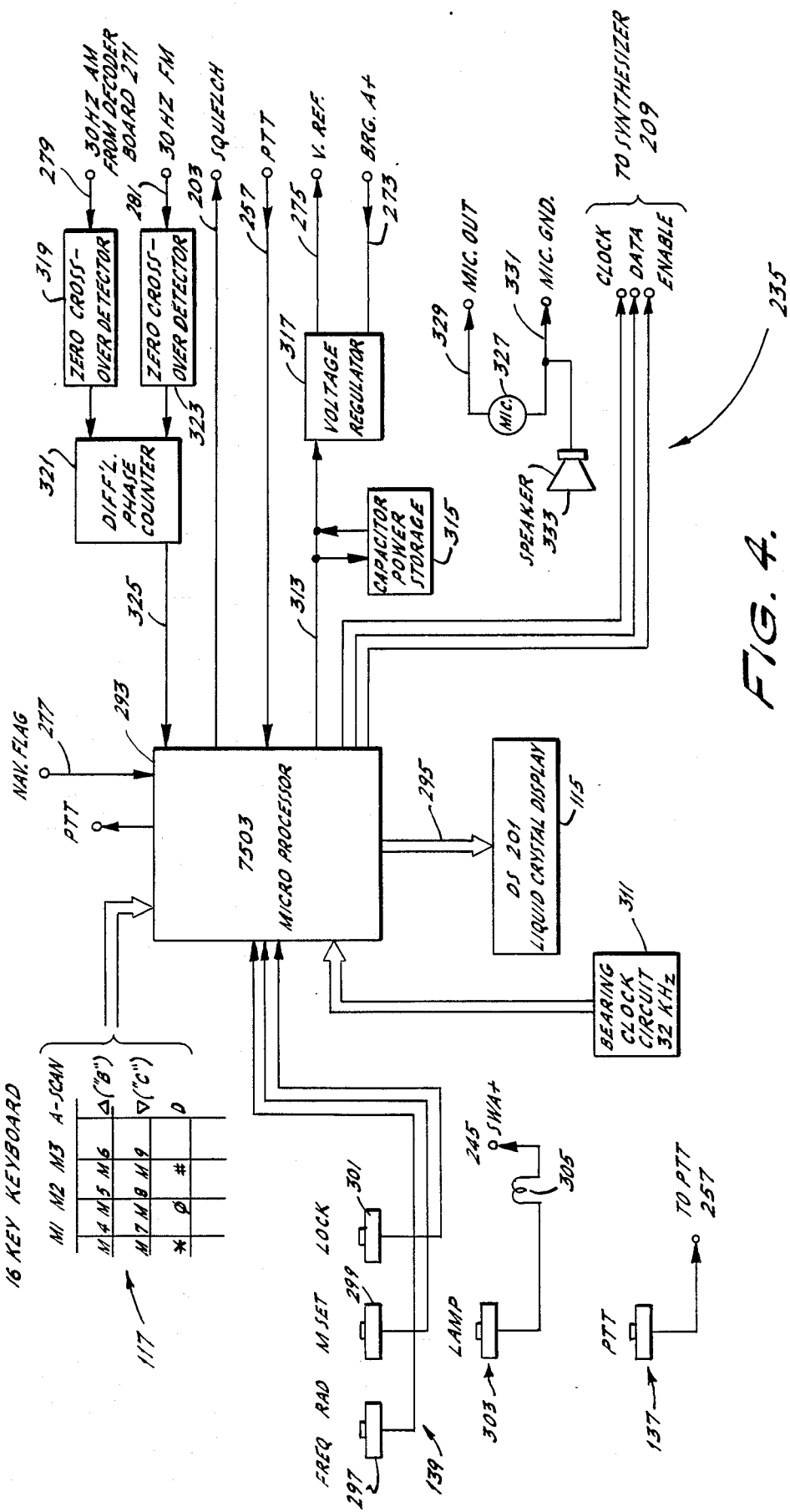
FIG. 4 is a circuit block diagram of the keyboard select switches, and microprocessor board component.

The microprocessor board 235 is shown in greater detail in FIG. 4.

The 16 key key board 117 is connected through a bus to a microprocessor circuit 293. This microprocessor circuit 293 can be implemented by a N.E.C. model 7503 microprocessor. This microprocessor 293 is a CMOS LSI implemented circuit. This microprocessor 293 circuit is available in the marketpalce, but it has a program memory which must be custom loaded with software.

The microprocessor 293 drives a model D.S. 201 liquid crystal display 115 through a connection bus 275.

The select function panel 139 includes the frequency/RAD selection switch 297, the "M" set switch 299, the lock switch 301 and the lamp switch 303. Each of the first three switches 297, 299 and 301 has its output connected into the microprocessor 293. The lamp switch 303 is connected to a lamp 305 for illiminating the liquid crystal display and connects to the switch A+ signal 245.

The NAV flag signal 277 from the decodor board 271 is input to the microprocessor 293. This microprocessor also send a PTTsignal 257 to the circuit of FIG. 2 discussed above.

The microprocessor 293 also has connected to it a bearing clock circuit 311. This timing circuit 311 operates at 32 KHz.

The microprocessor 293 includes a clock output signal 231, a data signal 235, and an enable signal 233 each of which are sent to the synthesizer 209 on the COM and NAV circuit of FIG. 2.

Microprocessor 293 also includes a voltage reference signal 313 which can be maintained by a capacitor storage circuit 315 connected to this line. This reference signal 213 is connected into a voltage regulator 317 which has an input signal being the bearing A+ signal 273 sent from the COM and NAV circuit of FIG. 2. The regulator circuit provides an output voltage REF signal 275 sent to the circuit, FIG. 2.

The PTT signal 257 is generated by the push to talk switch 137 and is input into the microprocessor 297. This microprocessor 293 also has as an output squelch switch signal 203.

The 30 Hz AM signal 279 from the decoder board 271 is input into a first zero cross over detector circuit 319 which operates as a pulse shaper. The output from this first zero cross over detector circuit into a differential phase counter 321.

The 30 Hz FM signal 281 from the decoder board 271 is input into a zero cross over detector circuit 323. The output from this second detector 323 is input into the differential phase counter 321. This phase counter circuit 321 provides its output line 325 as an input into the microprocessor 293.

A microphone 327 provides a mic out signal 329 and is connected to mic ground signal 331, as well as, a connection to a speaker 333.

Figure 5:
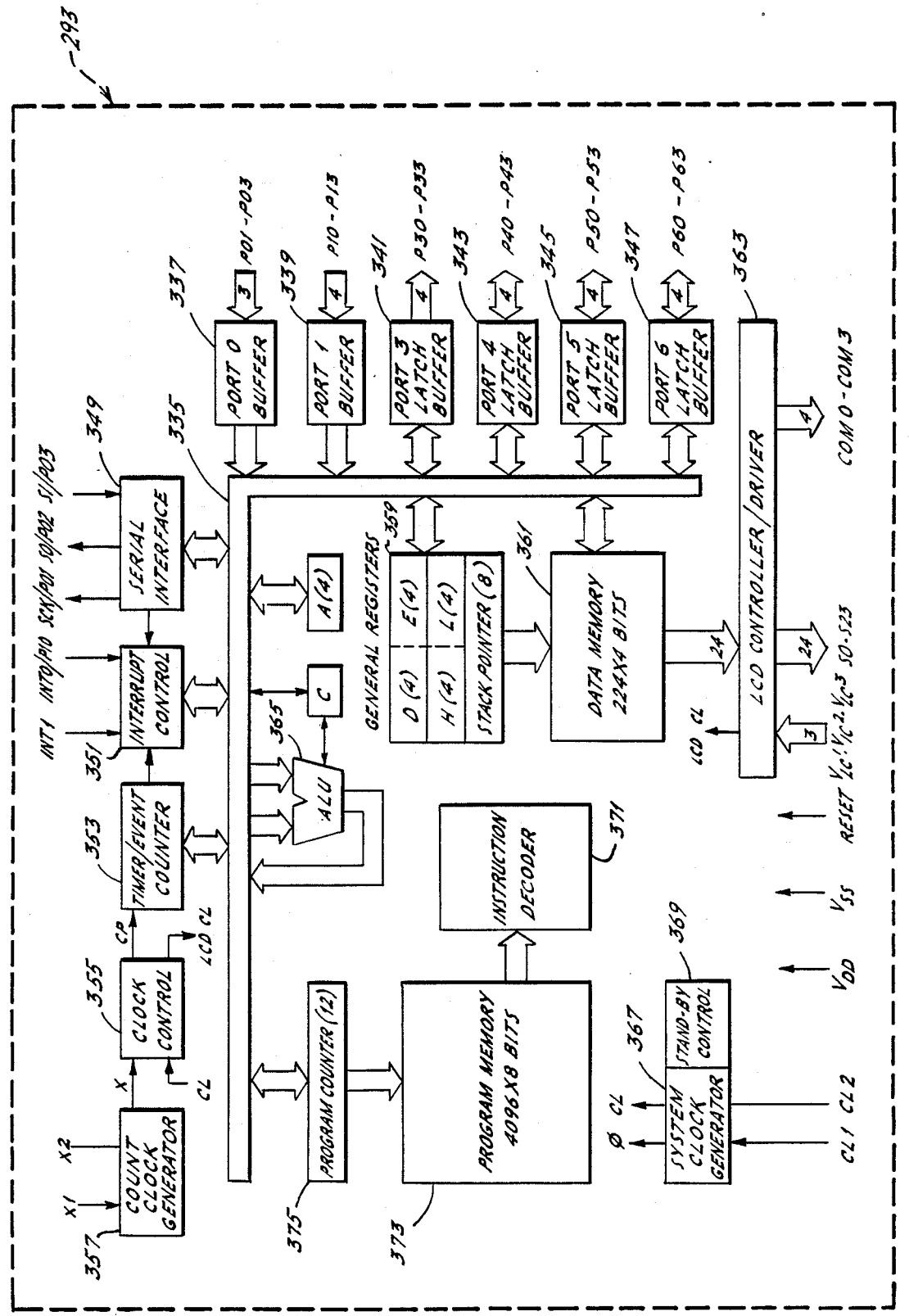
FIG. 5 is a circuit block diagram of the microprocessor, and the custom program software memory (program memory) holding the navigational processing instructions.

The model 7503 microprocessor 293 is shown in greater detail in FIG. 5. This microprocessor is an four bit internal bus 335 device. It includes seven ports 337, 339, 341, 343, 345, and 347 connected through respective buffers to the bus 335. Bus 335 is also has connected to it a serial interface circuit 349, an interupt control 351, and a timer and event counter circuit 353. The timer and event counter circuit 353 is connected to a clock control circuit 355 which in turn is connected to a clock count generator 357.

A plurality of general registers 359 are also connected to the bus 335, as well as, to a data memory 361 which operates as a working memory. This data memory 361 is connected to the bus 335, as well as, to a liquid crystal display controller driver interface circuit 363.

The circuit includes an arithmetic logic unit 365 connected to the bus 335, as well as, a system clock generator 367, and a stand by control circuit 369 which provide general microprocessor 293 timing signals.

An instruction decoder 371 receives information from a program memory 373. Program memory holds the custom loaded software previously mentioned. This program memory is also connected to a program counter 375. The program counter is also connected to the bus 335.

A custom program of software instructions is loaded into the program memory 373. This memory 373 is implemented as programable read only memory commonly known as a ROM. FIG. 6 through 19 show the logic flow chart for implementing this software.

Figure 6:
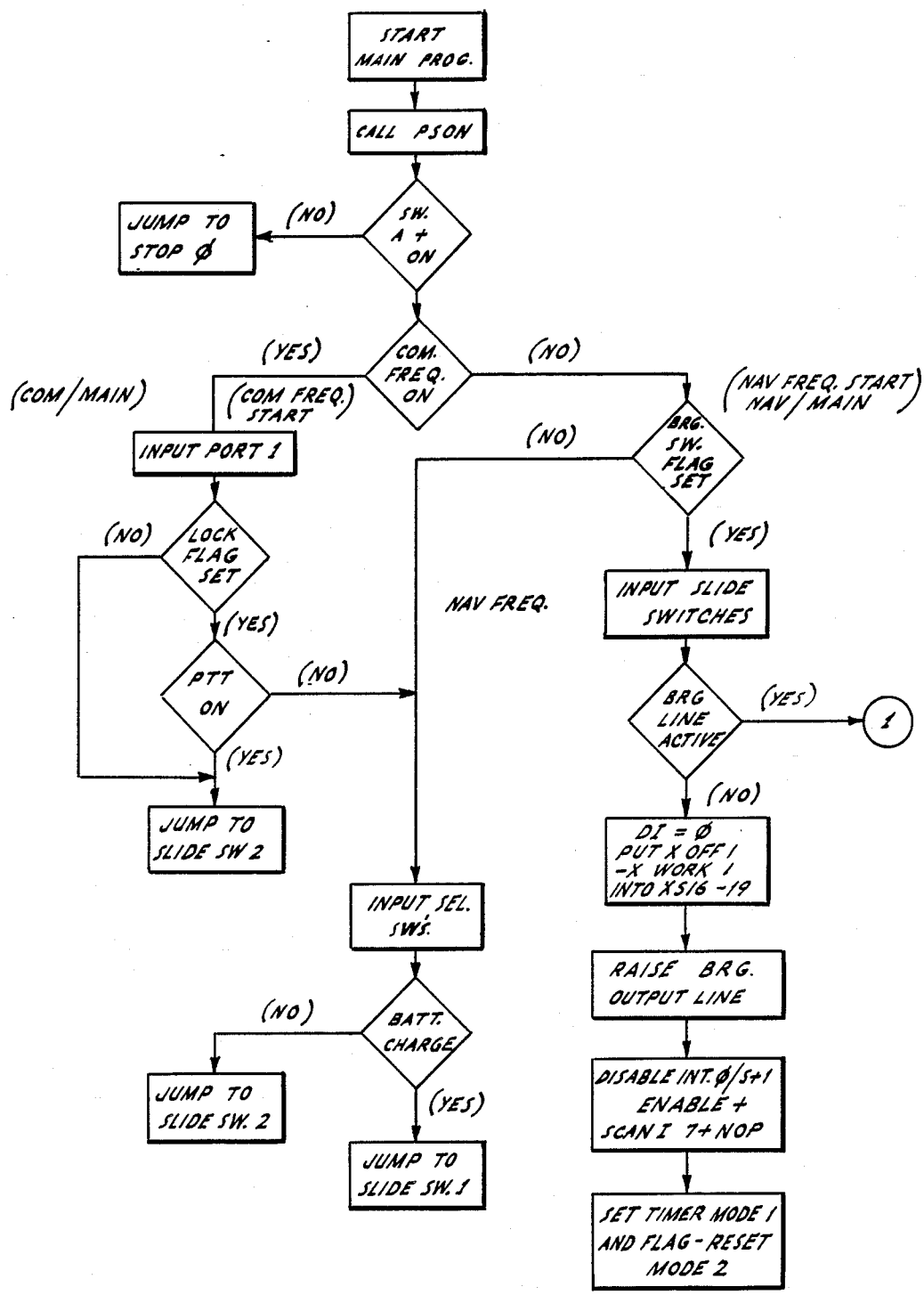
Figure 7:
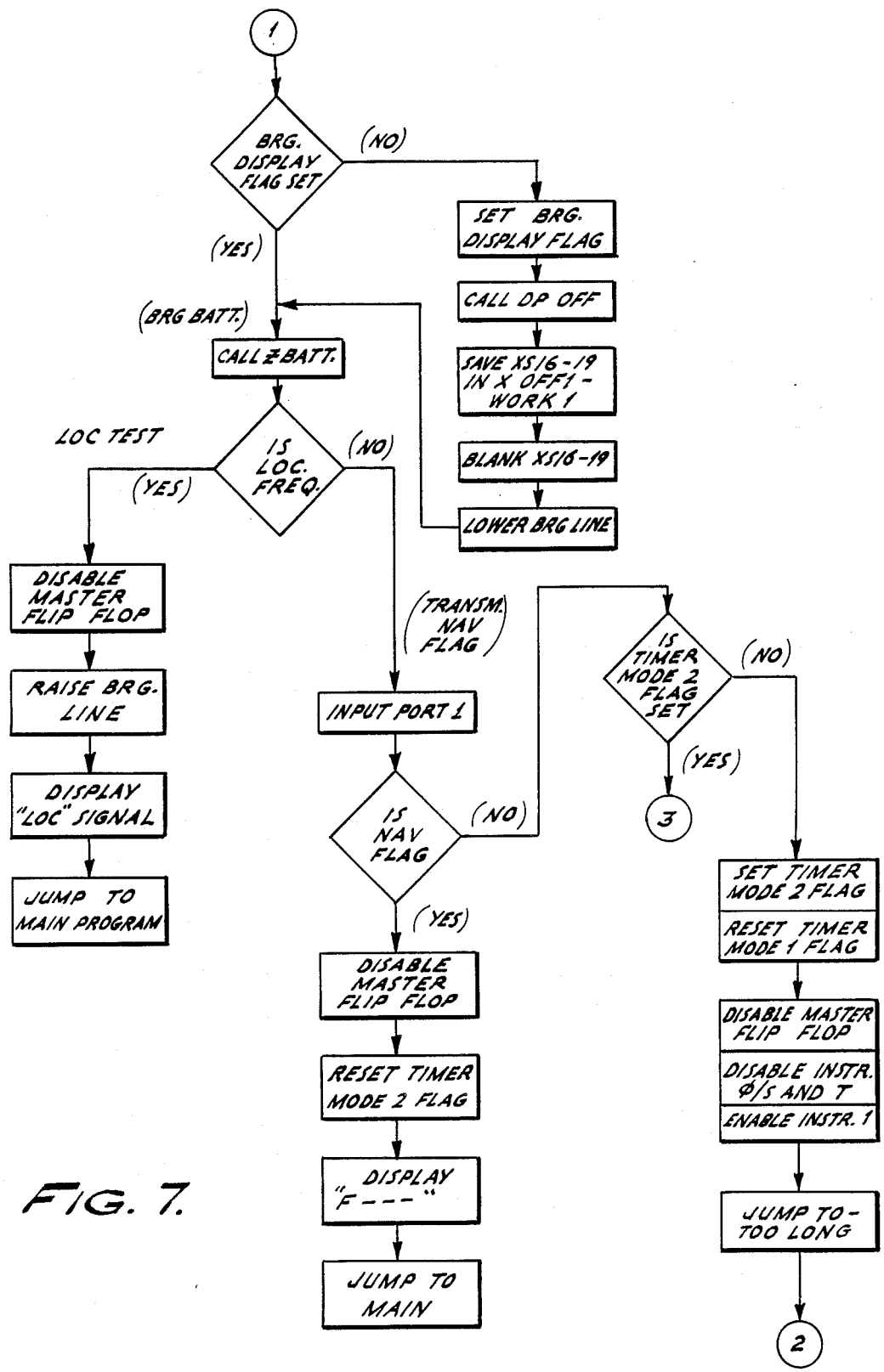
Figures 8, 11:
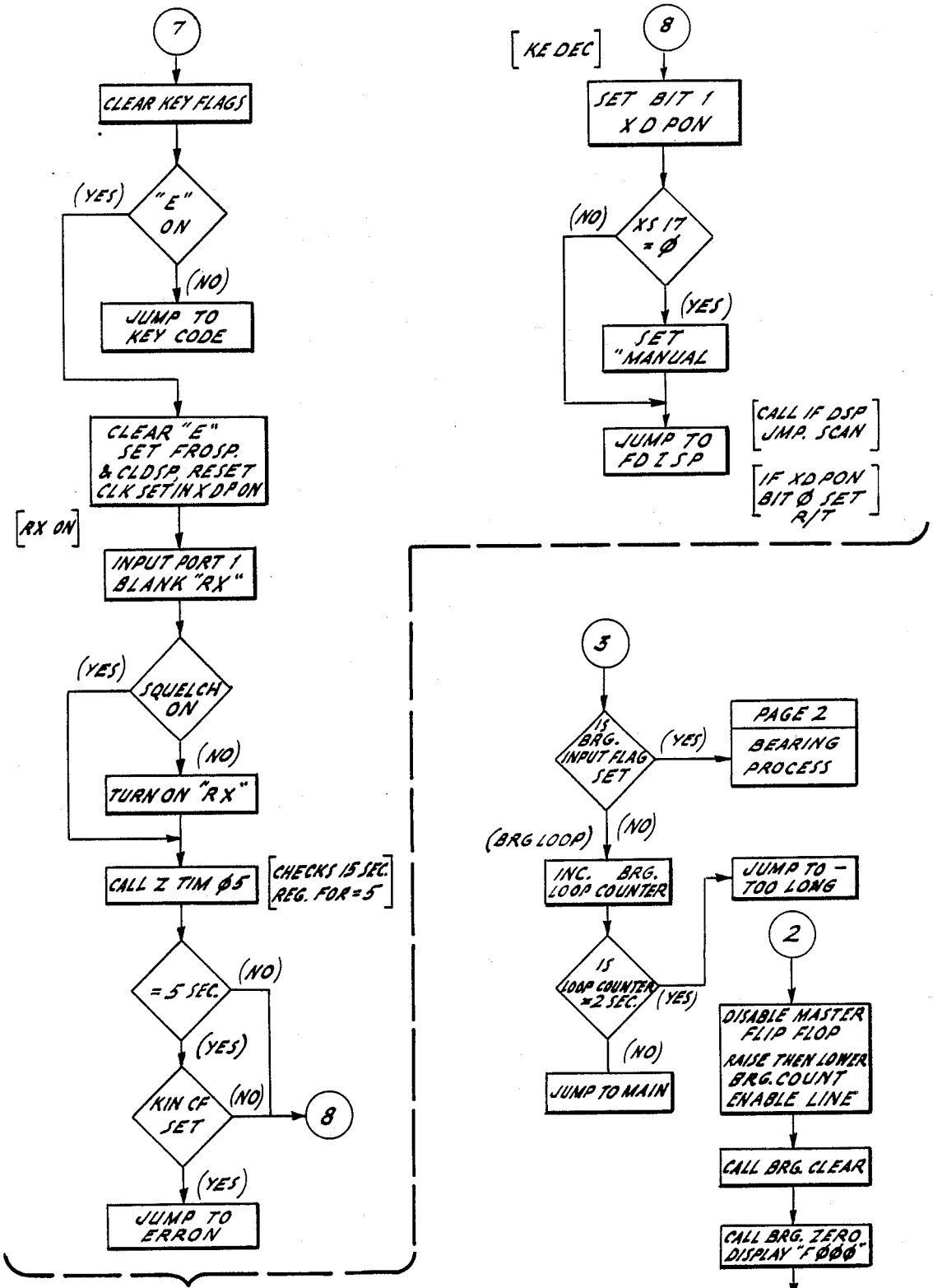
Figure 9:
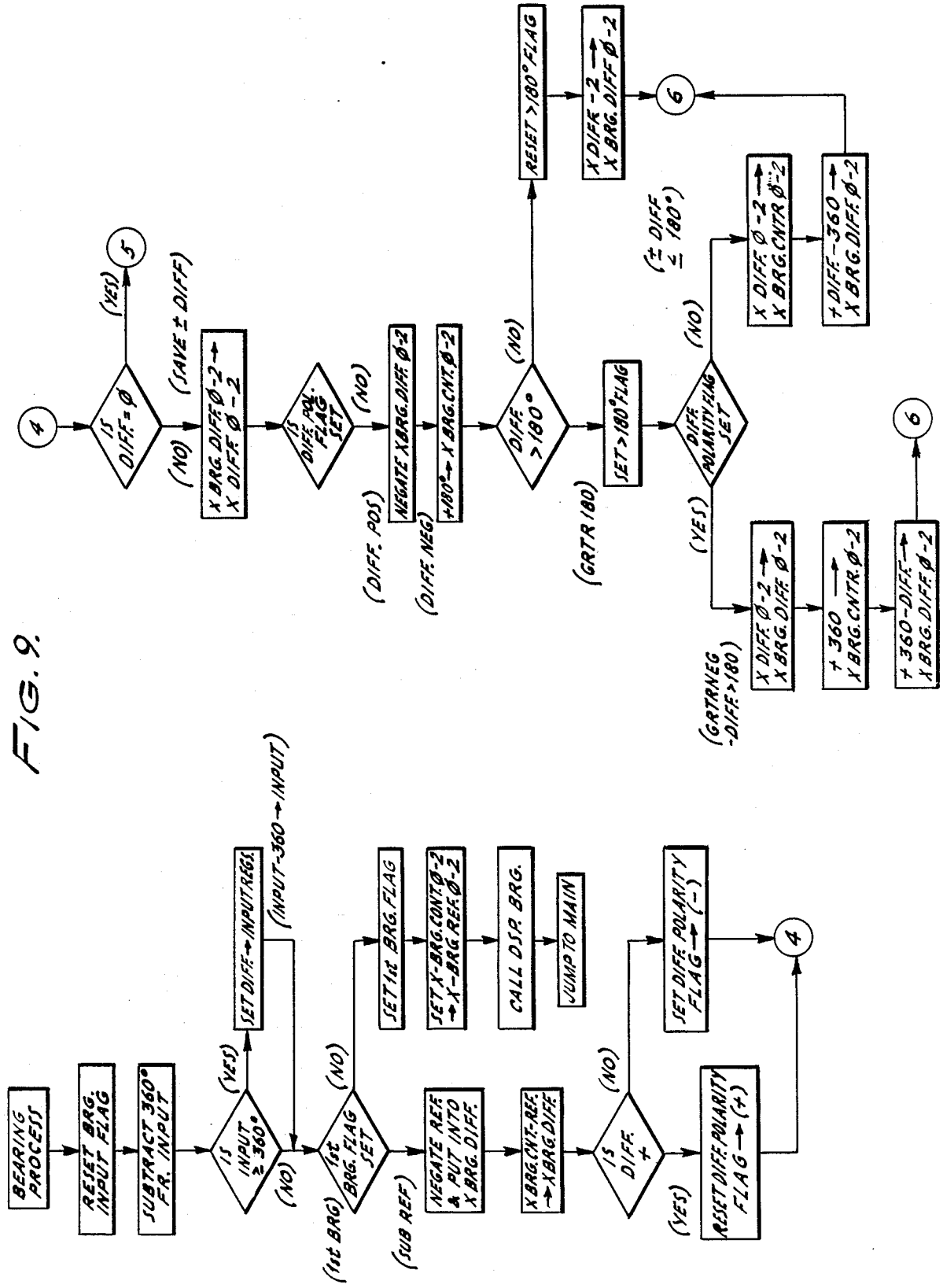
Figure 10:
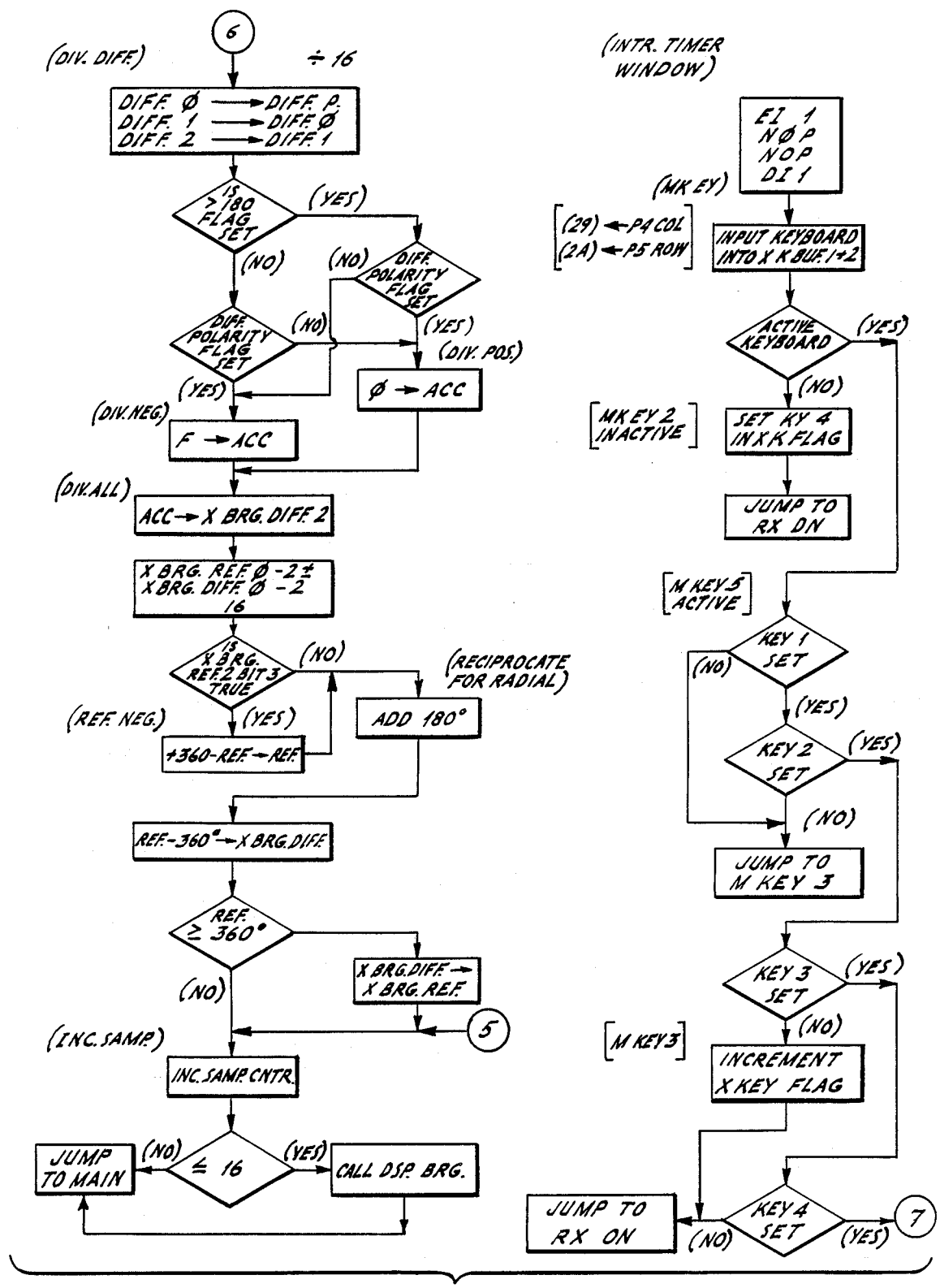
Figure 12:
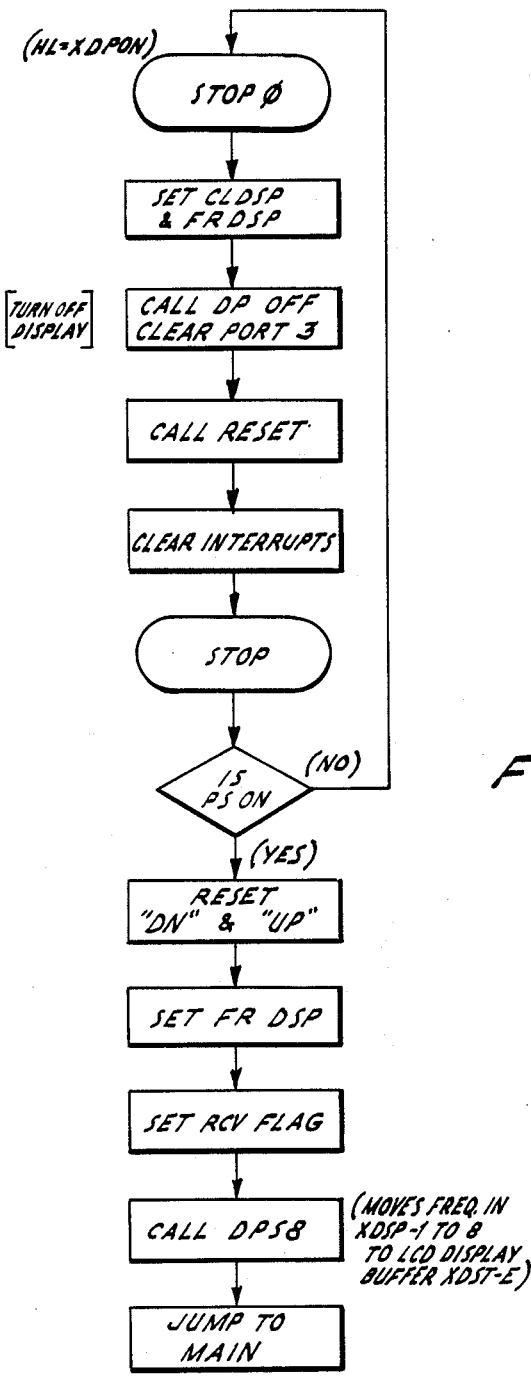
Figure 15:
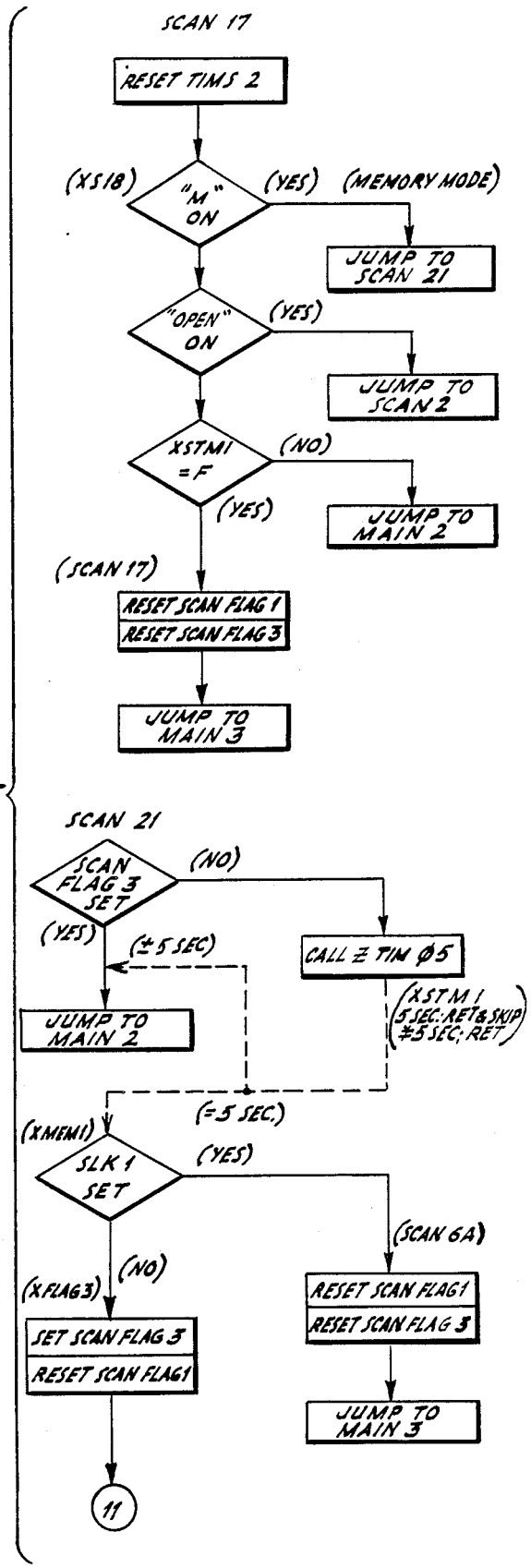
Figure 14:
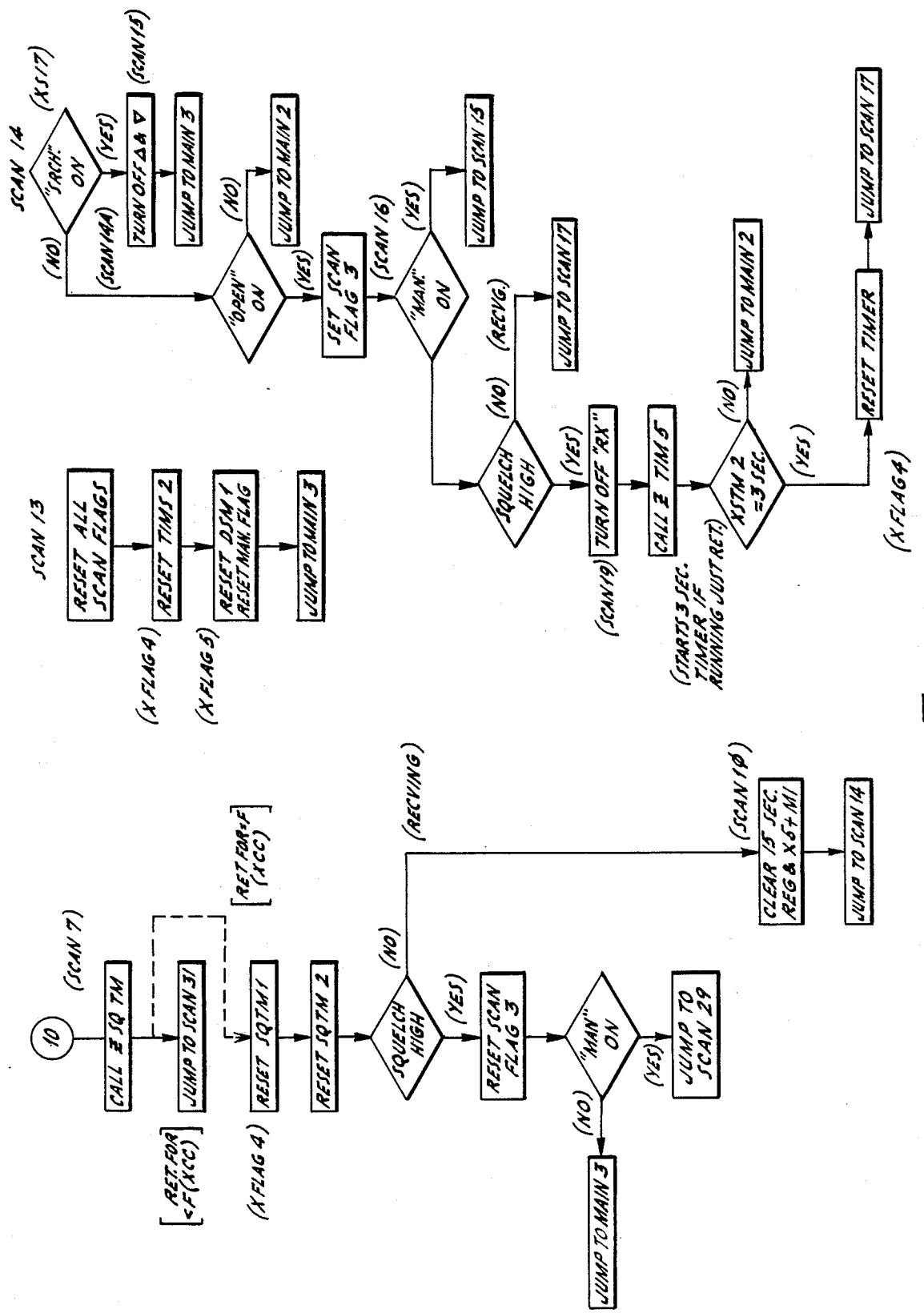
Figure 16:
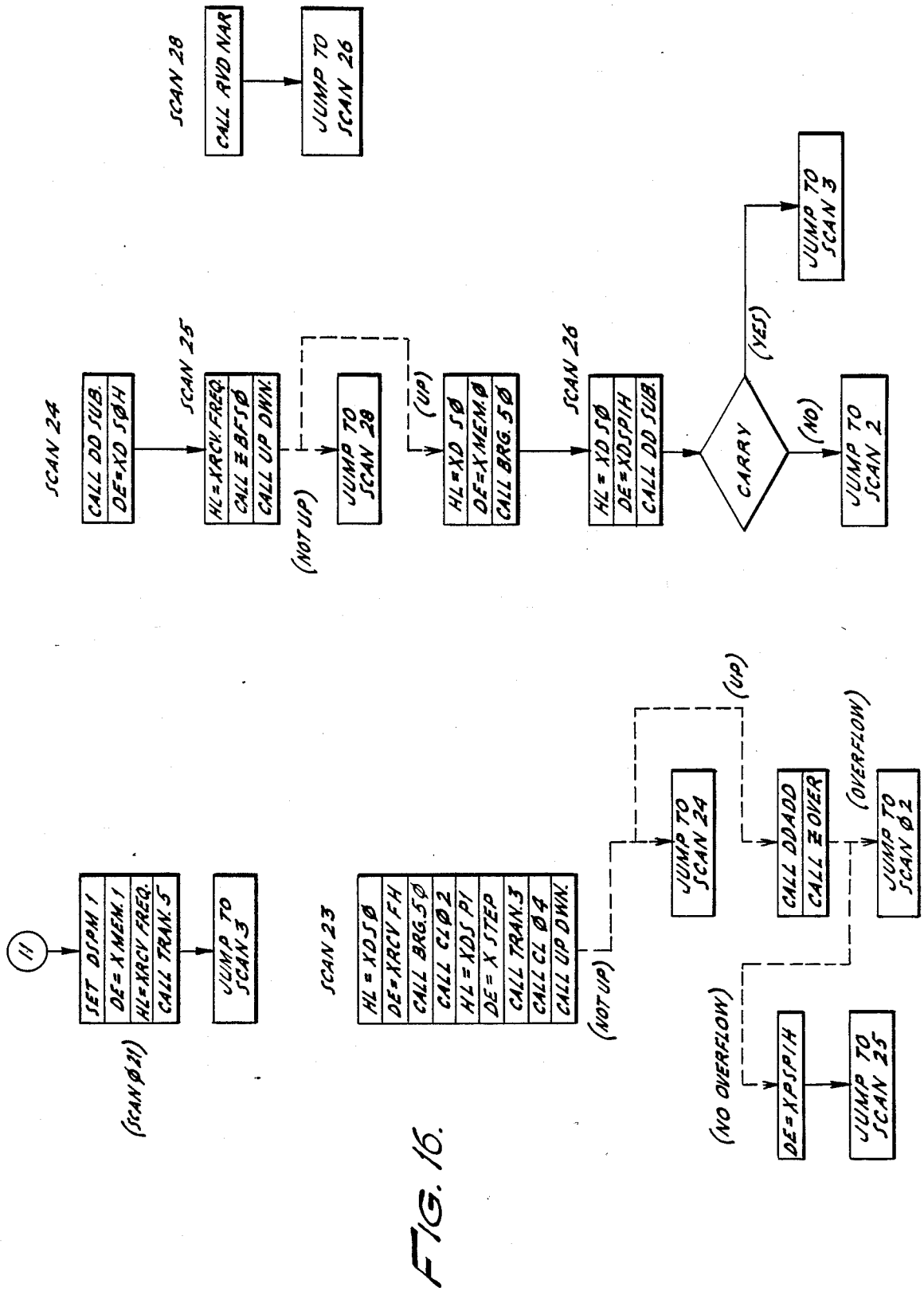
Figure 18:
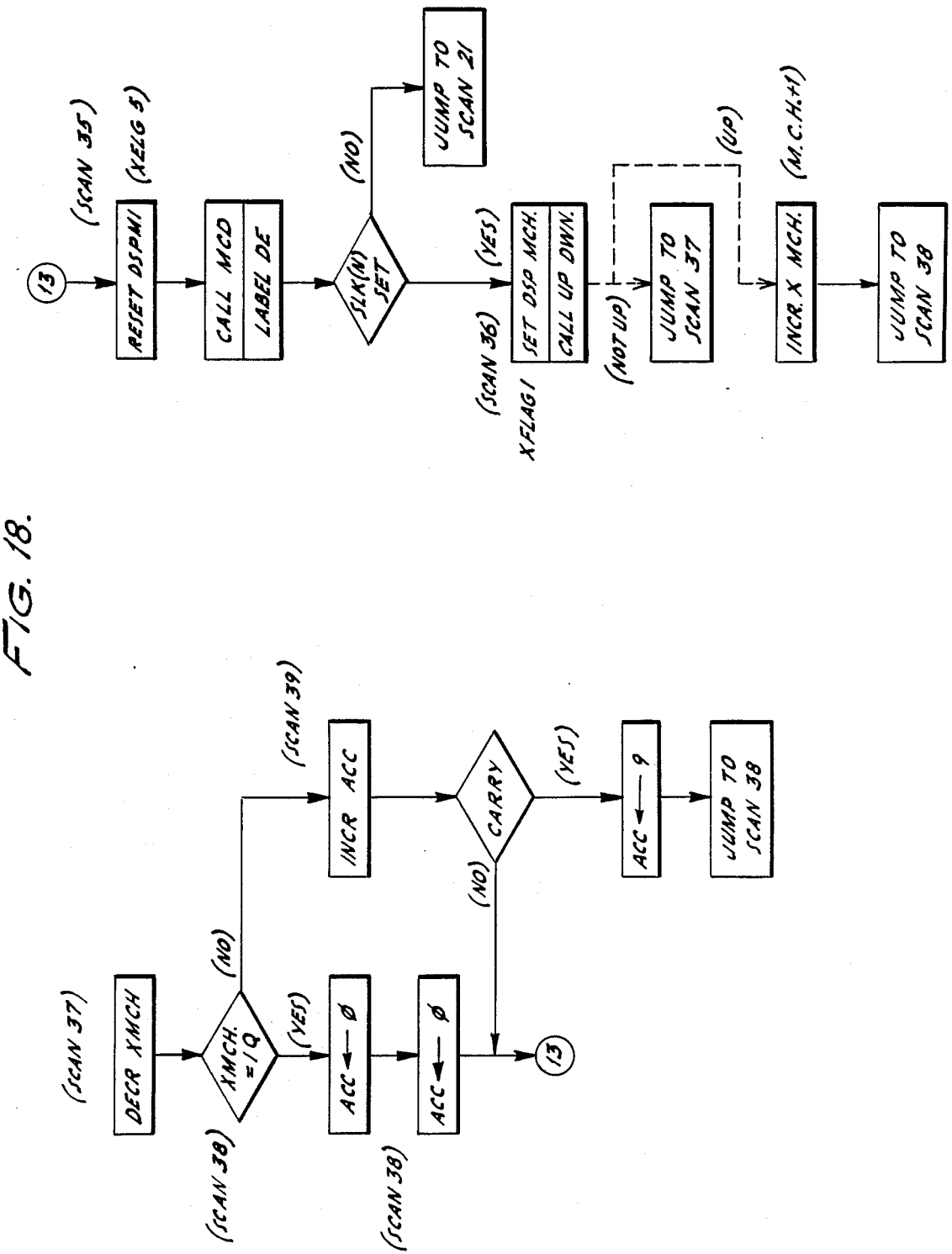

FIG. 6 shows the initiation of the main program and an interrogation of the status of the unit including initialization of the system. FIGS 7 and 8 show the initialization of the bearing search mode, LOC display and NAV flag display.

FIG. 9 through 12 show the calculation of the bearing value digitally. This calculation sets up a phase difference of two received signals to determine a window i.e. an electronic count period. This electronic count is equated to bearing degrees. While the output from the calculation is in bearing degrees from the station, the bearing in degrees to the station can be easily obtained as the suplemental angle in degrees (i.e. the difference from 360°).

Figure 19:
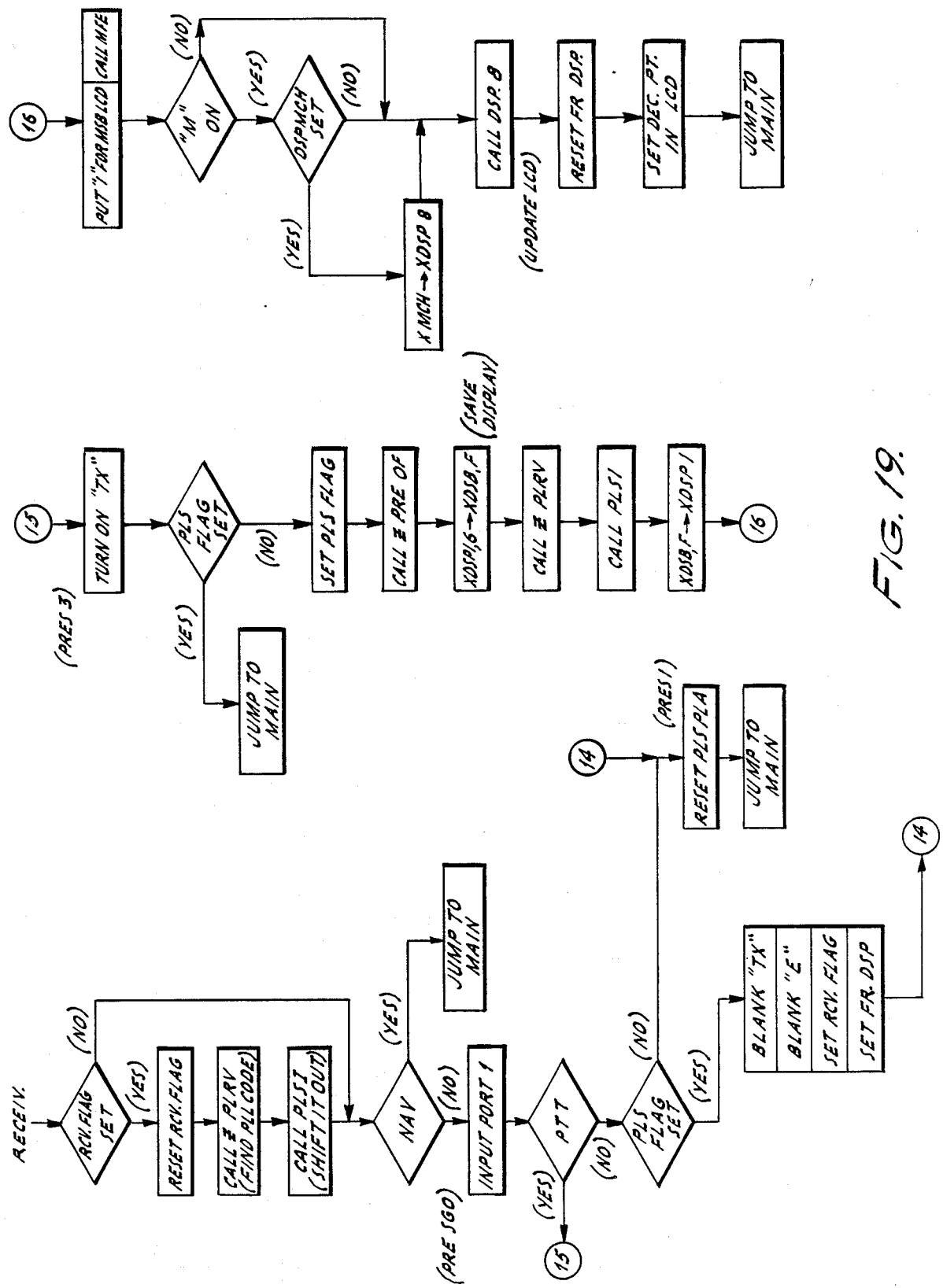

FIG. 13 through 18 show the scan operation for station search as selected between manual, automatic and up/down scan. FIG. 19 shows the receiver mode operation for blanking bearing and scan and intializing the system for the receiver operation in COM mode and also small rountines including tuning the RF phase lock loop operation.

The operator can program the COM and NAV frequencies in the microprocessor 293 memory 373 according to the following 10 steps:

1. Set the FREQ RAD slide switch to the FREQ position.

2. Clear the display of the letter "E" or "M" if one is present. To clear an "E", depress any key. To clear an "M" depress "D" Key.

3. Assign a NAV or COM frequency as described above.

4. Turn the M-SET slide switch to the ON position to enable the "MW" Key.

5. Depress the "MW" Key. Confirm that the letters "MW" appear in the display.

6. Depress that location key (M0 to M9) at which the frequency is to be stored. When the key is depressed, the frequency is stored. Confirm that when the location key is depressed that the letters "MW" change to "M" (memory mode), and that a numeral corresponding to the location number appears to the left of the frequency in the display.

7. Depress "D" Key ("M" disappears from LCD) to take the radio out of the memory mode and put it in the Band Mode. Remember, you can only assign a frequency in the Band Mode of operation.

8. Assign a frequency for the next memory location.

9. Keep repeating Steps 5, 6, 7 and 8 until all the desired locations are programmed.

10. Turn M-SET slide switch OFF to disable the "MW" Key.

The Band Mode of Operation permits transmission and reception over any of 720 COM channels or over selected bands. The operator may choose to receive and transmit over a single channel or to automatically scan a chosen band of frequencies.

When the FREQ RAD slide switch is in the FREQ position and the letter "M" (memory mode) does not appear in the display, then the radio is in the Band Mode of Operation. If the letter "M" appears in the display, then the radio is in the Memory Mode of Operation. The "B" Key must be depressed to switch the radio out of the Memory Mode and into the Band Mode of Operation.

The operator can choose from amongst the following scan modes:

1. One of four types of scanning modes.

2. The upper and lower scan limits.

3. Scan direction, UP or DOWN.

Band Mode scanning proceeds UP or DOWN in 25 Khz steps. One of the four scanning modes (MAN, SCAN, SRCH, OPEN), can be selected. The display shows MAN, SCAN, SRCH, OPEN, MAN------in repeated order.

The operation of each of the following four scanning modes is a follows.

MAN: To select this mode, repeatedly depress the "A" key until MAN appears in the display. The MAN (manual) scanning mode permits the operator to manually shift the frequency in 25 KHz steps by repeatedly depressing either the UP scan key "B" or DOWN scan key "C". Each time the "B" key is depressed, an UP arrow appears at the right hand side of the display signifying that the previously displayed frequency was shifted up by 25 KHz. Each time the "C" key is depressed an DOWN arrow appears at the far right hand side of the display signifying that the previously displayed frequency was shifted down by 25 KHz. The frequency was shifted down by 25 KHz. The frequency that appears in the display is the one the operator can receive (RX) or transmit (TX) over.

SCAN: To select this mode, repeatedly depress the "A" Key until SCAN appears in the display. When the SCAN mode is selected, the radio will automatically scan up or down (selected by operator) in 25 KHz steps between upper and lower frequency limits that are selected by the operator. When a busy channel is encountered (RX appears in display) the scan stops for 10 seconds and then resumes. When the scanning limit is reached, up or down, the scan automatically returns to the opposite limit and resumes.

SRCH: To select the SRCH (search) mode, repeatedly depress the "A" Key until SRCH appears in the display. When the SRCH mode is selected, searching will be identical to the SCAN mode except that when a busy channel (RX appears in the display) is encountered, the search STOPS and will not resume. The search will remain frozen at this channel until the operator depresses either the "C" or "B" key to resume the search scan. When the upper or lower search limit is reached, the search automatically returns to the opposite limit and resumes.

OPEN: To select the OPEN mode, repeatedly depress the "A" key until OPEN appears in the display. Scanning in the OPEN mode is identical to the SCAN mode, except that when a busy channel is encountered, the scan stops and monitors the busy channel for as long as the channel remains active. Three seconds after the signal opens, the scan is automatically resumed between its limits.

There are differences between the Memory Mode of Operation and the Band Mode of Operation; and, they are:

Reception and transmissions are possible only over those COM frequencies stored in locations M0 to M9.

Note: NAV frequencies may also be stored in memory.

There are no lower or upper scan limits to set. UP scanning is from location M0 to M9 sequentially. DOWN scanning is from location M9 to M0 sequentially.

Memory Location Lockout: Locations M1 to M9 can be locked out of the scanning sequence. Location M0 cannot be locked out.

PCS (priority channel scanning): This feature is restricted to the SCAN scanning mode and, in addition, only when the radio is in the Memory Mode of Operation. The SCAN Mode of scanning has an added feature called "priority channel scanning". When the radio locks onto a busy channel for 10 seconds and then resumes the scan, the scan does not begin with the next memory channel in sequence. The scan departs the normal sequence and shifts over to location M1, the designated priority channel. If M1 is not active, the scan jumps back in sequence starting with the next location above the previously locked location. However, if M1 is busy when it is scanned, then the radio will lock onto M1 and stay locked on until the signal opens. The scan then departs M1 and jumps back into sequence starting with the location next in sequence from the previously locked on location.

The unit has a memory location lockout feature that allows one or all of the locations M1 to M9 to be locked out of manual or automatic scanning. Location M0 cannot be locked out as this location determines the upper frequency limit of an UP scan. This lockout feature pertains only to the Memory Mode of Operation. When a memory location is locked out, that location is passed over in the sequential up or down scanning.

This feature can be chosen to be implemented by the operator when only a few selected stored channels need to scanned or one or more particular channels are so busy that they interfere with the scanning of the other channels.

The unit can be selectively switched into the 200 channel NAV mode of operation since VOR navigation is made possible by the digital Radial from station feature. When swithed into the NAV made the COM transmitter operation is inhibited.

The various methods and modes of operation are implemented by the software resident in the microprocessor 293 ROM 373 the flow chart for this software being shown in FIGS. 6–19.

Figure 20:
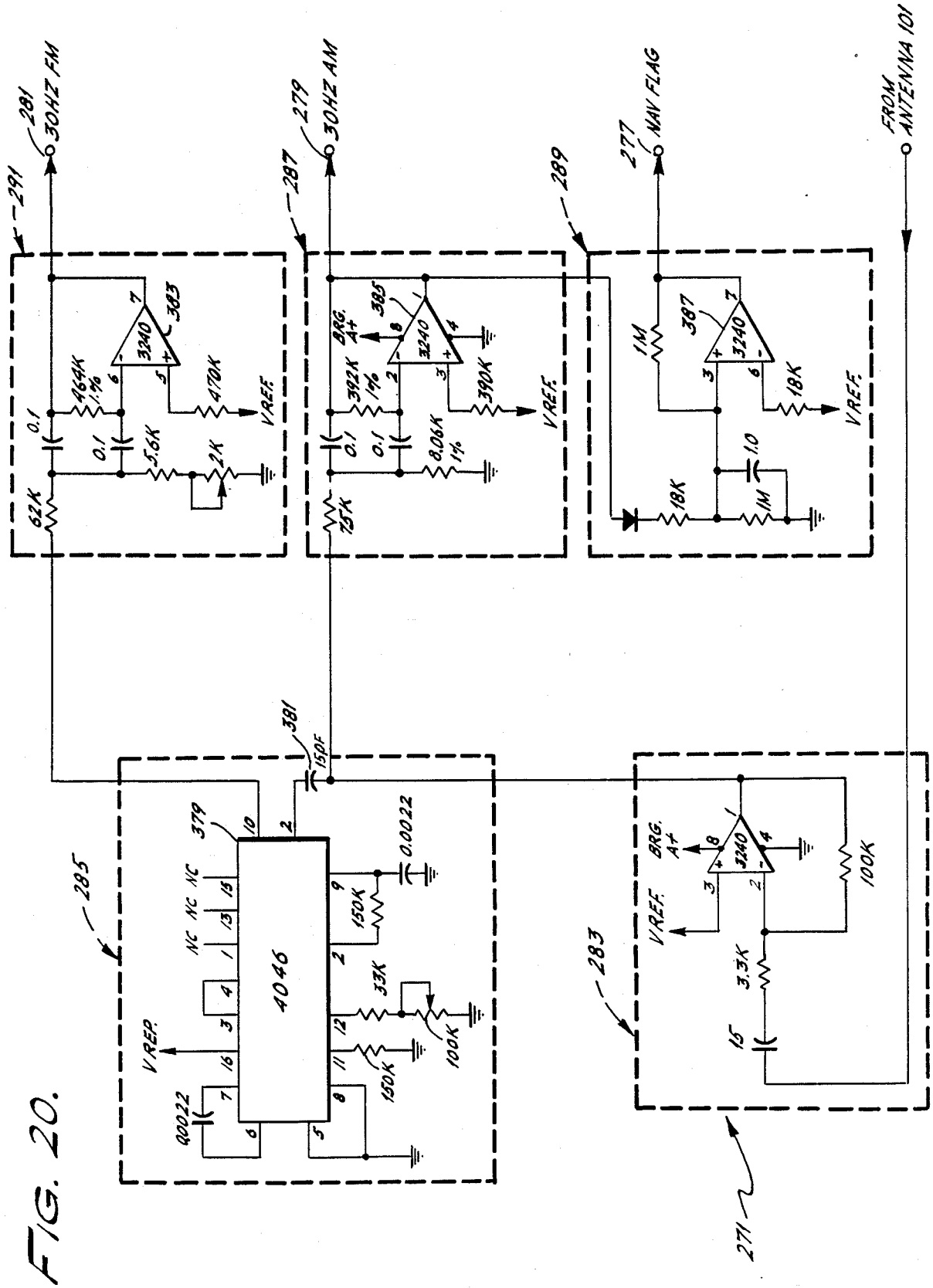
FIG. 20 shows a descrete circuit connection of components implementing the decoder board of FIG. 3.

The discrete component implementation of the NAV decoder board 271 is shown in FIG. 20.

The operational amplifier circuit 283 is implemented with a Motorola 3240 type amplifier circuit 377. The output of the amplifier is connected to theinput of a Motorola 4046 CMOS type discriminator circuit 379 through a 15 pf capacitor 381.

The output of the discriminator circuit 379 is connected into a second amplifier 383 circuit set up to filter out signals and pass 30 Hz Fm.

The output from the first operational amplifier circuit 377 is also connected as the input to a third operational amplifier circuit 385. This operational amplifier circuit 385 is set up to filter out signals and pass 30 Hz AM.

The output of the third operational amplifier circuit 385 is also input to a fourth operational amplifier circuit 387. This fourth amplifier circuit 387 is set up as a threshold detector.

Each of the above circuits 377, 379, 383, 385 and 387 are connected with attendant resistor and capacitor circuit components to establish timing and frequency desired. This information is available from the manufacturer.

The output from the second amplifier 383 is the 30 Hz FM signal 281. The output from the third amplifier circuit is the 30 Hz AM signal 279. The output from the fourth amplifier circuit 387 is the NAV flag signal 277.

Figure 21:
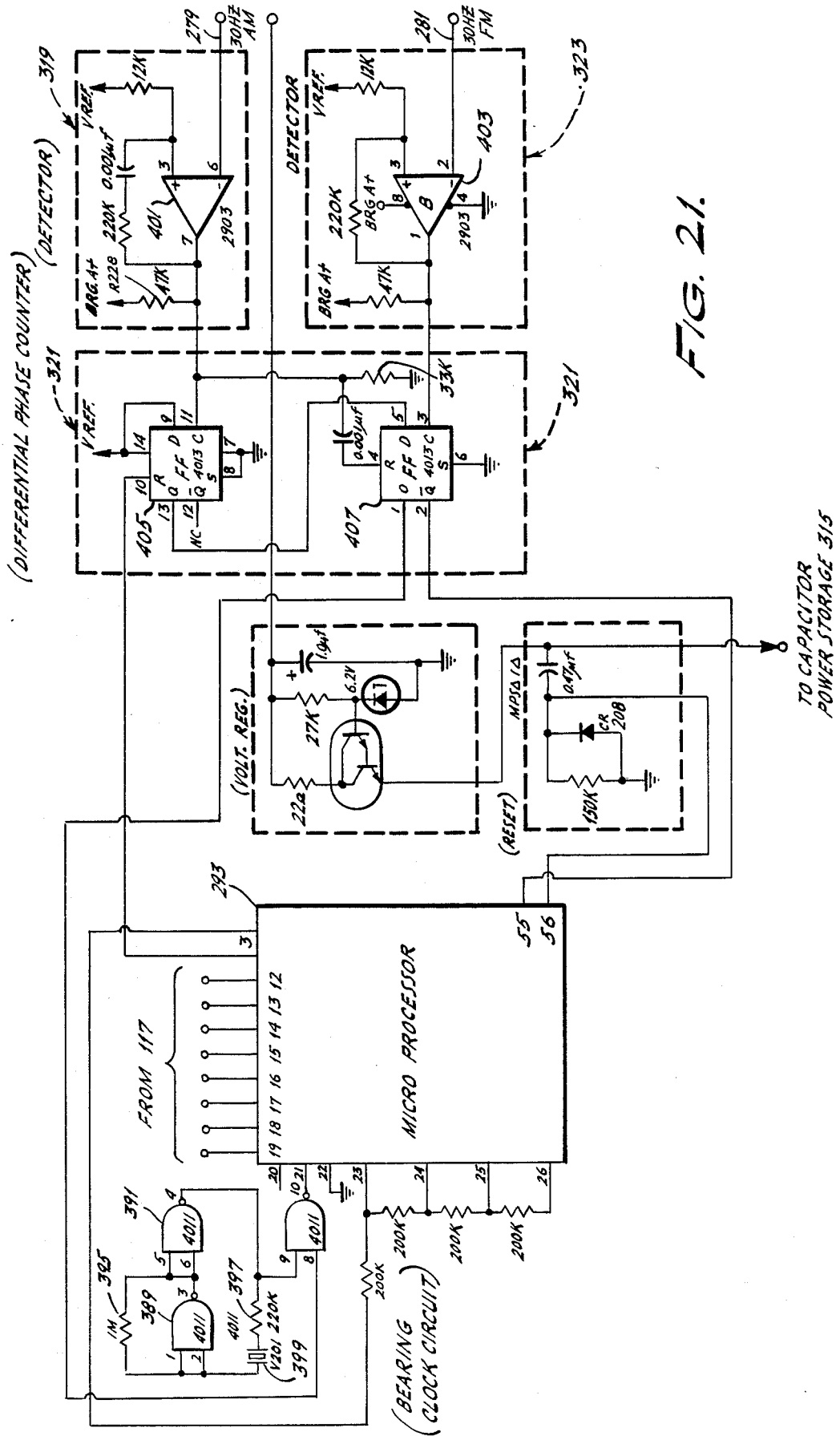
FIG. 21 shows a descrete circuit connection for the clock function, differential phase counter, (between AM and FM) shown in block form in FIG. 4.

FIG. 21 shows in more detail the bearing clock timing circuit 311 and the differential phase counter 321 of FIG. 4.

This circuit includes a triad of two input NOR gates 389, 391, 393. The first of these NOR gates 389 is connected on the input of the second NOR gate 391 with a 1 megohm resistor 395 feed back line. The output of the second NOR gate 391 is input into the third NOR gate 393 with a 200 kohm resistor 397 and 32 KHz crystal 399 series connection feed back from the second NOR gate 391 output to the first NOR gate 389 input.

The third NOR gate 393 also has an input line from the divide by 16 flip flops 321.

The 30 Hz Am signal 279 is input into a first 2903 type operational amplifier 401 circuit supplied by Motorola. This operational amplifier 401 is connected with attendant resistor and capacitor circuitry to operate as a zero cross over detector to become the detector 319 of FIG. 4.

The 30 Hz FM signal 281 is input into a second 2903 type operational amplifier 403 circuit. This circuit 403 is also connected as a zero cross over detector to become the detector 323 of FIG. 4.

The output from the amplifier 401 is connected to clock a first D-type flip flop 405. The output from the amplifier 403 is connected to clock a second D-type flip flop 407. The flip flops 405, 407 are connected in series with the output of the first flip flop 405 being connected into the input of the second flip flop 407.

The true output of the second flip flop 407 is connected into an input of the third NOR gate 393. The complement output from the second flip flop 407 is connected into pin 55 of the microprocessor 293.

Some other connections seen from FIG. 21 for the microprocessor 293 include an 8-bit bus from the keyboard 117 connected to microprocessor 293 pins 12 through 19 and the output of the third NOR gate 393 connected to microprocessor pin 21.

The description above is intended to be illustrative of the invention. Changes can be made in the circuitry of the software program implementation without changing the scope or intent of the invention.

What is claimed:

1. A navigational communications transceiver for providing radio communication, bearing information and a localizer signal indicator, comprising:
   antenna connection;
   a radio receiver circuit connected to said antenna connection;
   an audio amlifier circuit connected to said radio receiver circuit;
   a speaker connected to said audio amplifier circuit;
   a RF phase lock loop circuit connected to said radio receiver circuit;
   a microprocessor connected to said phase lock loop circuit and to said radio receiver circuit;
   a display connected to said microprocessor;
   a keyboard connected to said microprocessor;
   a radio transmitter circuit connected to said microprocessor;
   a microphone connected to said radio transmitter circuit;
   an output amplifier circuit connected to the output of said radio transmitter circuit, the output of said output amplifier circuit being connected to said antenna connection;
   a VOR phase lock loop circuit connected between said radio receiver and said microprocessor; and
   a programmable memory connected to said microprocessor and containing instructions:
   wherein said memory and the instructions thereof operate in conjunction with said microprocessor to calculate bearing information and to provide the bearing decoder function whereby the phase difference between two signals establishes an electronic counter period wherein pulses received are counted and converted into bearing information by said microprocessor under stored program instructions, this calculation being performed entirely within the microprocessor and memory structure.

2. The transceiver of claim 1 wherein said microprocessor connection to said radio receiver circuit is for receiving signals therefrom; wherein said microprocessor connection to said VOR phase lock loop circuit is for receiving signals therefrom; wherein said microprocessor connection to said radio transmitter circuit is for receiving signals therefrom; and also including a connection between said RF phase lock loop circuit and said microprocessor for sending signals in both directions therebetween.

3. The transceiver of claim 2 wherein said RF phase lock loop circuit includes transmitter inhibit logic circuit connected from said RF phase lock loop circuit, said transmitter inhibit logic circuit providing an inhibit signal output and a NAV and a COM status signals output; a push to talk (PTT) logic control circuit connected on its input to the inhibit logic circuit and on its output to said radio receiver circuit; and a push to talk switch connected to said PTT logic circuit.

4. The transceiver of claim 3 wherein said transmitter inhibit logic circuit, COM and NAV status output signals are connected to said radio receiver circuit.

5. The transceiver of claim 4 wherein said radio receiver circuit includes:
   an RF amplifier connected to said antenna connection;
   a mixer circuit connected to said RF amplifier output;
   an IF filter connected to said mixer circuit output;
   an IF amplifier connected to said IF filter output;
   a detector circuit connected to said IF amplifier output;
   an A.G.C. circuit connected on its input to said detector circuit and on its outputs to said IF amplifier circuit and having inputs being said NAV and COM status signals from said transmitter inhibit logic; and to said RF amplifier circuit;
   a noise limiter circuit connected to the output of said detecter circuit;
   a volume control connected between said noise limiter output and said audio amplifier input; and
   a squelch circuit connected on its output to said audio amplifier and on its input to said A.G.C. circuit.

6. The transceiver of claim 5 wherein said phase lock loop circuit also includes:
   a voltage controlled oscillator (VCO) circuit connected on an output into said mixer circuit;
   a buffer amplifier connected to said VCO circuit output;
   a prescaler circuit connected to said buffer amplifier;
   an RF loop filter connected on its output to said VCO circuit and to said RF amplifier circuit; and
   wherein said phase lock loop circuit includes a synthesizer circuit connected on its output to said loop filter and on another output to said transmitter inhibit logic and to said prescaler circuit.

7. The transceiver of claim 6 also including an RF buffer connected to said VCO output; a buffer amplifier connected to said RF buffer; a transmitter circuit connected to said buffer amplifier; an output amplifier connected to said transmitter circuit; and a low pass filter connected between said transmitter circuit and said antenna connection.

8. The transceiver of claim 1 wherein said microprocessor includes a decoder board connected thereto, said decoder board being connected to said antenna connection and containing an operational amplifier connected to said antenna connection; an FM discriminator circuit connected to said operational amplifier; a 30 Hz FM filter connected to said FM discriminator circuit; a 30 Hz AM filter connected to said operational amplifier; and a threshold detector connected to said operational amplifier.

9. The transceiver of claim 8 also including a first zero cross over detector circuit connected to said 30 Hz AM filter output; a second zero cross over detector circuit connected to said 30 Hz FM filter output; and a differential phase counter circuit connected to said first and second zero cross over detector circuit outputs, said differential phase counter circuit being connected on its output to a said microprocessor input.

10. The transceiver of claim 9 wherein said threshold detector output is a NAV FLAG signal which is connected to an input of said microprocessor.

11. The transceiver of claim 10 wherein said differential phase counter circuit includes a pair of D-type flip flops connected in series, an output from said second flip flop being connected to said microprocessor, said first cross over detector output being connected to clock said first flip flop and said second cross over detector output being connected to clock said second flip flop.

12. The transceiver of claim 1 wherein said microprocessor includes a bearing clock circuit connected to said microprocessor to provide separate clock signals thereto.

13. The transceiver of claim 12 wherein said bearing clock circuit includes a triad of NOR gates connected to establish a bearing calculation timing clock circuit, said triad being connected to said microprocessor inputs.

14. The transceiver of claim 1 wherein said microprocessor calculation of bearing information and provision of bearing decoder function under said stored program instructions includes determining bearing angle TO a ground station and converting it into bearing angle FROM that ground station.

15. The transceiver of claim 14 wherein said microprocessor calculation also includes calculating the difference between a reference signal and 360 degrees to establish a first difference value and evaluating that first difference value with respect to 180 degrees.

16. The transceiver of claim 14 wherein said microprocessor calculation of bearing information is continually reiterative with said microprocessor being in said bearing calculation operation state.

* * * * *

REEXAMINATION CERTIFICATE (2259th)
United States Patent [19]
Bongiorno et al.

[11] B1 4,843,399
[45] Certificate Issued Apr. 5, 1994

[54] PORTABLE NAVIGATIONAL COMMUNICATIONS TRANSCEIVER

[75] Inventors: Robert A. Bongiorno, Glenside; John F. Smith, Warminster, both of Pa.

[73] Assignee: Narco Avionics, Inc., Fort Washington, Pa.

Reexamination Request:
No. 90/002,857, Oct. 13, 1992

Reexamination Certificate for:
Patent No.: 4,843,399
Issued: Jun. 27, 1989
Appl. No.: 892,065
Filed: Jul. 30, 1986

[51] Int. Cl.$^5$ .............................................. G01S 1/44
[52] U.S. Cl. .................................. 342/404; 342/451; 342/49
[58] Field of Search .................. 342/401, 404, 49, 50, 342/51, 413, 419, 455, 394, 396, 442, 451, 127; 324/830; 364/451, 452, 461; 328/133, 134

[56] References Cited
U.S. PATENT DOCUMENTS

| | | | |
|---|---|---|---|
| 4,488,108 | 12/1984 | Treise et al. | 328/133 X |
| 4,551,854 | 11/1985 | Rutty et al. | 455/78 |
| 4,651,282 | 3/1987 | Robinson et al. | 364/449 X |
| 4,675,614 | 6/1987 | Gehrke | 342/401 X |

OTHER PUBLICATIONS

Motorola MC6846, ROM-I/O-Timer Data Sheets; Motorola, Inc.; 1978, 1981.
FCC Application for the Escort II Radio, Narco Avionics, Inc., Jul. 23, 1984 File Number 31010/EQU 4-3-1, FCC Identifier A9S9KBESCORTII.
"Compact Naucom"; Airwaves, Flying Magazine, Oct. 1984, p. 90.
Narco's HT-830 NAV/Com Radio News Release, Jul. 1985.
"Handheld Coms Flourish at Oshkosh", EAA Oshkosh '85 Saturday Flying Newsletter, Jul. 27, 1985, CBS Magazines Publisher Nav 824/825 Maintenance Manual, Narco Avionics Inc Jun., 1981.
"King KNS 81 Digital Area Navigation System Maintenance/Overhaul Manual", Dec. 1981, Published by Aircraft Technical Publishers.
Narco's FCC Application for equipment authorization for the HT-800 Radio, Filed May 12, 1983, Granted Aug. 2, 1983.
Narco's FCC Application for equipment authorization for the HT-830 Radio, Filed Jun. 12, 1985, Granted Jul. 9, 1985.

*Primary Examiner*—Tod R. Swann
*Agent, Attorney, or Firm*—Panitch Schwarze Jacobs & Nadel

[57] ABSTRACT

A hand held navigational-communications transceiver is compressed into a case having a volume of about 37 cubic inches by defining functional implementation for VOR (VHF omni-directional range) navigation. The transceiver can be selectively switched to process and display directional radial information. A microprocessor circuit provides primary circuitry information in combination with transceiver function software held in ROM (read only memory). A plurality of pre-programmed frequencies may be selected.

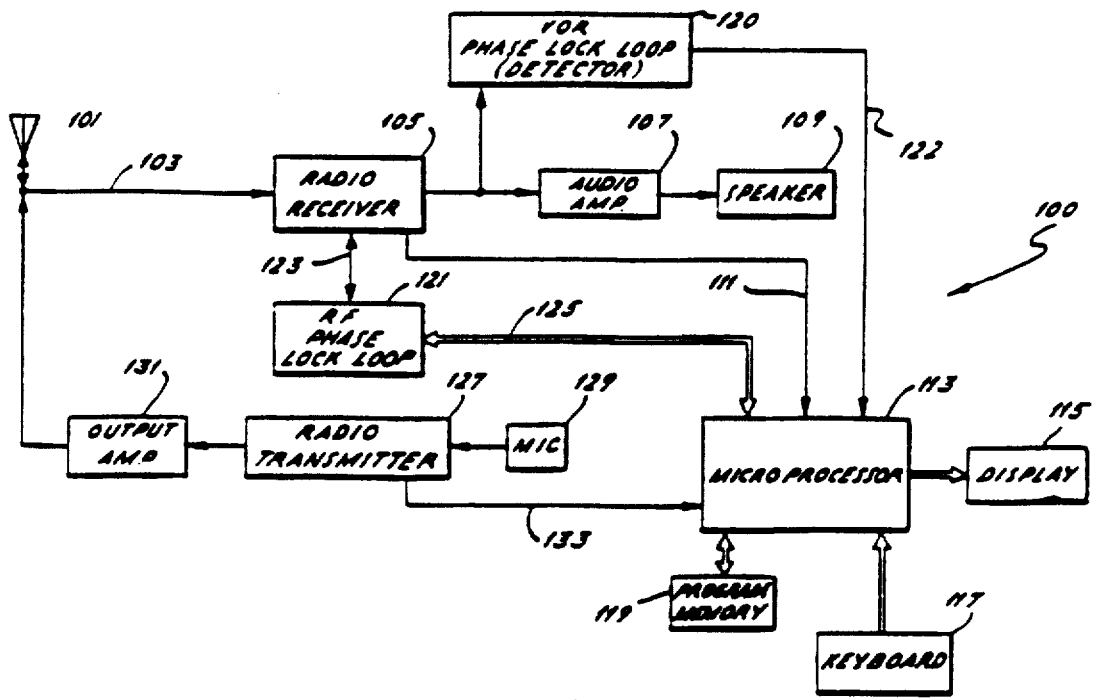

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-16 is confirmed.

* * * * *